US012294851B2

(12) United States Patent
Eubank et al.

(10) Patent No.: US 12,294,851 B2
(45) Date of Patent: May 6, 2025

(54) METHOD AND SYSTEM FOR AUDIO BRIDGING WITH AN OUTPUT DEVICE

(71) Applicant: Apple Inc., Cupertino, CA (US)

(72) Inventors: Christopher T. Eubank, Santa Barbara, CA (US); Ronald J. Guglielmone, Jr., Redwood City, CA (US)

(73) Assignee: Apple Inc., Cupertino, CA (US)

( * ) Notice: Subject to any disclaimer, the term of this patent is extended or adjusted under 35 U.S.C. 154(b) by 114 days.

(21) Appl. No.: 17/937,534

(22) Filed: Oct. 3, 2022

(65) Prior Publication Data

US 2023/0113703 A1 Apr. 13, 2023

Related U.S. Application Data

(60) Provisional application No. 63/254,444, filed on Oct. 11, 2021.

(51) Int. Cl.
*H04S 7/00* (2006.01)
*H04R 29/00* (2006.01)

(52) U.S. Cl.
CPC ........... *H04S 7/304* (2013.01); *H04R 29/001* (2013.01); *H04S 2400/13* (2013.01)

(58) Field of Classification Search
CPC .. H04S 7/304; H04S 2400/13; H04S 2420/01; H04S 7/00; H04R 29/001; H04R 27/00; H04R 1/1091; H04R 2460/13; H04R 29/00; G10L 25/06
See application file for complete search history.

(56) References Cited

U.S. PATENT DOCUMENTS

| | | | | |
|---|---|---|---|---|
| 7,668,964 | B2 | 2/2010 | Millington | |
| 9,912,373 | B1 | 3/2018 | Wang | |
| 11,146,909 | B1 | 10/2021 | Pinto et al. | |
| 11,190,899 | B2 * | 11/2021 | Stringer | H04S 5/005 |
| 11,805,381 | B2 | 10/2023 | Pinto et al. | |
| 2002/0126855 | A1 | 9/2002 | Terada | |
| 2013/0230086 | A1 | 9/2013 | Sorensen | |
| 2013/0251169 | A1 | 9/2013 | Awano | |
| 2014/0161270 | A1 | 6/2014 | Peters et al. | |
| 2014/0354441 | A1 | 12/2014 | Luna | |

(Continued)

FOREIGN PATENT DOCUMENTS

| | | | | |
|---|---|---|---|---|
| CN | 112969096 | * | 6/2021 | H04N 21/436 |
| JP | 6601030 B2 | | 11/2019 | |

OTHER PUBLICATIONS

Non-Final Office Action dated Nov. 7, 2022 for U.S. Appl. No. 17/481,844, 24 pages.

(Continued)

*Primary Examiner* — Yosef K Laekemariam
(74) *Attorney, Agent, or Firm* — Aikin & Gallant, LLP

(57) ABSTRACT

A method performed by a first electronic device that includes a first speaker, the method includes, receiving, via a network, a representation of audio content, while a second electronic device is playing back the audio content through a second speaker, determining that the first electronic device is moving away from the second electronic device, and, in response to determining that the first electronic device is moving away from the second electronic device, using the representation of audio to play back the audio content through the first speaker.

21 Claims, 7 Drawing Sheets

(56) References Cited

U.S. PATENT DOCUMENTS

| | | | | |
|---|---|---|---|---|
| 2018/0183881 | A1 | 6/2018 | Lewis et al. | |
| 2021/0297518 | A1* | 9/2021 | Keum | H04M 1/605 |

OTHER PUBLICATIONS

Leif Johnson, "How to hand off music or phone calls from your iPhone to a HomePod", received from https://www.macworld.com/article/233474/how-to-hand-off-music-or-phone-calls-from-your-iphone-to-a-homepod.html, Oct. 31, 2019, 6 pages.
Marc DeAngelis, "Spotify tests simplified speaker handoff feature", received from https://www.engadget.com/2019-08-13-spotify-tests-simplified-speaker-handoff-feature.html, Aug. 13, 2019, 1 page.
Notice of Allowance dated Jun. 14, 2021 for U.S. Appl. No. 16/870,752, 13 pages.

* cited by examiner

METHOD AND SYSTEM FOR AUDIO BRIDGING WITH AN OUTPUT DEVICE

This application claims the benefit of U.S. Provisional Patent Application No. 63/254,444, filed on Oct. 11, 2021, which application is incorporated herein by reference.

FIELD

An aspect of the disclosure relates to a system that bridges audio playback between one or more playback devices and an output device of a user. Other aspects are also described.

BACKGROUND

Headphones are audio devices that include a pair of speakers, each of which is placed on top of a user's ear when the headphones are worn on or around the user's head. Similar to headphones, earphones (or in-ear headphones) are two separate audio devices, each having a speaker that is inserted into the user's ear. Headphones and earphones are normally wired to a separate playback device, such as a digital audio player, that drives each of the speakers of the devices with an audio signal in order to produce sound (e.g., music). Headphones and earphones provide a convenient method by which a user can individually listen to audio content, while not having to broadcast the audio content to others who are nearby.

SUMMARY

An aspect of the disclosure is a method performed by a first electronic device, such as a headset that includes a first speaker. The first device receives, via a computer network (e.g., the Internet), a representation of audio content. While a second electronic device is playing back the audio content through a second speaker, the first device determines that the first device is moving away from the second electronic device. In response to determining that the first electronic device is moving away from the second electronic device, the representation of the audio content is used to play back the audio content through the first speaker.

In one aspect, the representation of audio content includes playback data that indicates a playback state of the audio content at the second electronic device, and using the representation of audio content to play back the audio content includes using the playback data to synchronize playback of the audio content by the first electronic device with the playback state. In another aspect, the method further includes determining an acoustic time of flight (ToF) of sound produced by the second speaker, the playback state includes a timestamp of a portion of the audio content that is to be played back by the second electronic device, using the playback data to synchronize playback includes playing back the portion of the audio content through the first speaker according to the timestamp while taking into account the acoustic ToF, such that sound of the portion of the audio content produced by the second speaker of the second electronic device and sound of the portion of the audio content produced by the first speaker of the first electronic device is synchronized as perceived by a user of the first electronic device. In some aspects, the first device determines an acoustic time of flight of sound produced by the second speaker, where the portion of the audio content is played back according to the timestamp while taking into account the acoustic time of flight.

In one aspect, the first electronic device plays back the audio content after the second electronic device plays back the audio content. In another aspect, playback by both the first and second electronic devices is perceived by a user who is holding or wearing the first electronic device as being synchronous, while both the first and second electronic devices playback the audio content asynchronously.

In one aspect, the first device determines a target sound level for the audio content based on the representation of audio content and determines a sound level of sound of the audio content played back by the second electronic device at a microphone of the first electronic device, where using the representation of audio content to play back the audio content through the first speaker includes playing back the audio content through the first speaker at a level that satisfies the target sound level based on the sound level. In some aspects, playback back the audio content through the first speaker at a level that satisfies the target sound level includes, in accordance with a determination, while the first electronic device is moving away from the second electronic device, that the sound level of the sound of the audio content at the microphone has changed, adjusting the level that satisfies the target sound level to compensate for the change to the sound level. In another aspect, adjusting the level that satisfies the target sound level includes applying a volume adjustment to the first electronic device based on a difference between the sound level and the change to the sound level. In one aspect, the level that satisfies the target sound level is increased as the first electronic device moves away from the second electronic device.

In one aspect, in accordance with a determination that the first electronic device is moving towards the second electronic device, the first device reduces a sound output level of the first speaker. In another aspect, using the representation of audio to play back the audio content includes using an audio signal that has the audio content to drive the first speaker, where reducing the sound output level of the first speaker includes attenuating a signal level of the audio signal at the first electronic device based on changes to a sound level of the sound of the audio content played back by the second electronic device at a microphone of the first electronic device as the first electronic device moves towards the second electronic device. In some aspects, in accordance with a determination that the first electronic device has moved within a threshold distance from the second electronic device, the first device stops playback of the audio content through the first speaker by ceasing to use the audio signal to drive the first speaker.

In one aspect, in accordance with a determination that the first electronic device is moving towards a third electronic device that is playing back the audio content through a third speaker, the first device reduces a sound output level of the first speaker. In some aspects, the first electronic determines a location of the second electronic device with respect to the first electronic device; and spatially renders the audio content according to the location to produce a virtual sound source that includes the audio content through the first speaker. In another aspect, the first electronic device is communicatively coupled via a wireless connection with the second electronic device, and where determining that the first electronic device is moving away from the second electronic device includes identifying a position of the first electronic device with respect to the second electronic device based on a received signal strength indicator (RSSI) of the wireless connection; and determining that the first electronic device is moving away from the position based on changes to the RSSI. In some aspects, the first device determines a sound level of sound of the audio content played back by the second electronic device at a microphone of the first electronic device, where determining that the first electronic device is moving away from the second electronic device includes detecting that the sound level of the sound is decreasing at a particular rate.

In one aspect, the first electronic device is a wearable device. In another aspect, the wearable device is a pair of smart glasses, and the first speaker is an extra-aural speaker. In another aspect, the first electronic device is a headset. In some aspects, the second electronic device is a smart speaker. In another aspect, the second electronic device is a television. In one aspect, the representation of the audio content includes the audio content. In another aspect, the representation of audio content includes an identification of the audio content. In some aspects, using the representation of audio content to playback the audio content includes using the identification of the audio content to retrieve an audio signal from either a remote electronic server or local memory of the first electronic device, wherein the audio signal includes the audio content; and using the audio signal to drive the first speaker to produce sound of the audio content.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1:
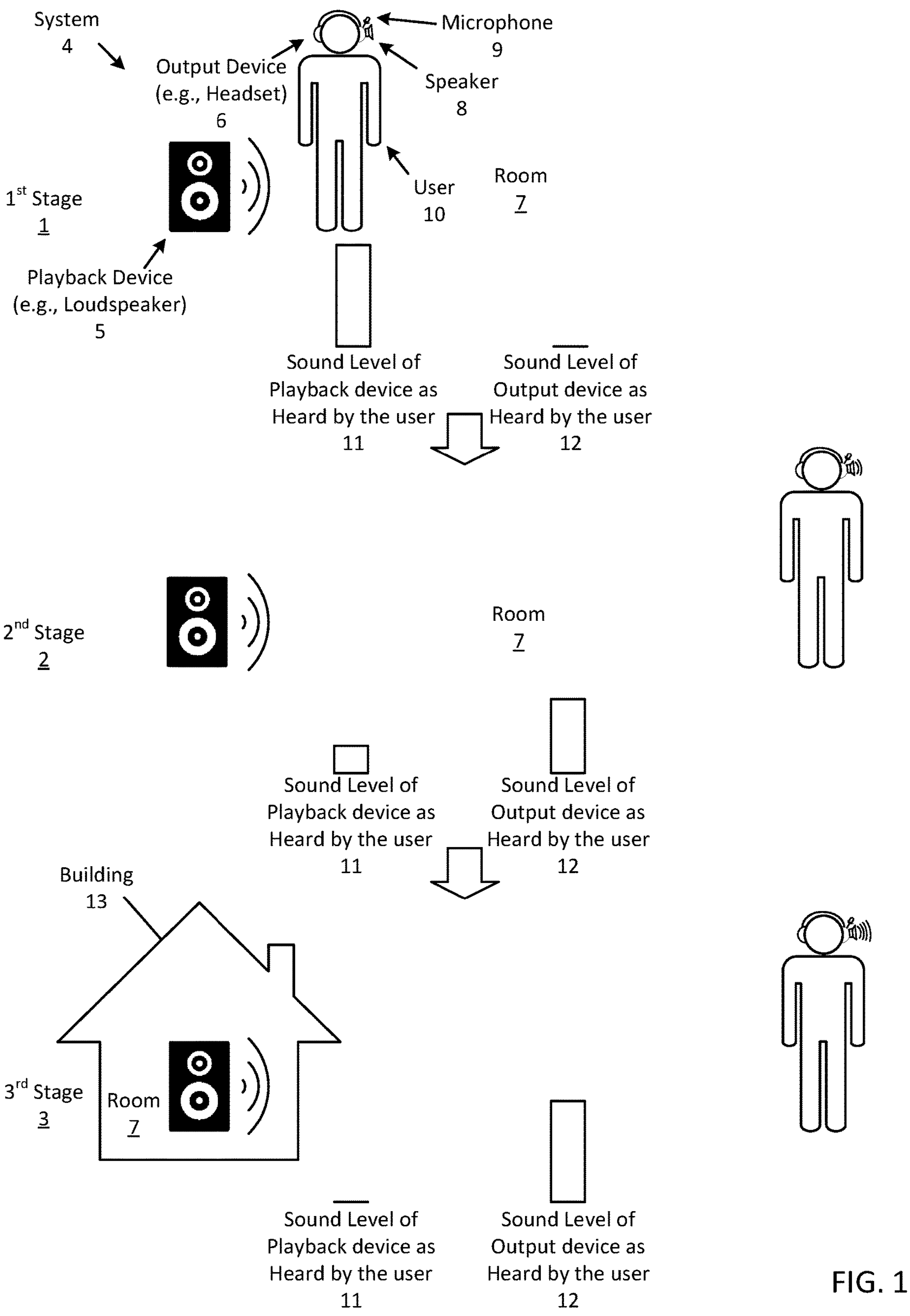
FIG. 1 illustrates several stages of a system in which an output device is operating as an audio bridging device that is playing back the same audio content that is being played back by a playback device in order to maintain a sound level of the audio content as heard by a user while the user moves away from the playback device.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Today, there are many consumer products that playback audio content (e.g., music, podcasts, etc.) into the ambient environment. For example, a product, such as a smart speaker, may link to an on-line music streaming platform that allows the smart speaker to stream music. A person may purchase the smart speaker and position it at a location within the person's home, where music played back by the speaker may be most enjoyed by the listener (e.g., inside a kitchen, a living room, a bedroom, etc.). Sound output, however, may be limited within a particular range, which may be based on equipment limitations of the smart speaker (e.g., size of speaker drivers of the smart speaker, power capacity, etc.) and/or the physical environment (e.g., size and shape of the room in which the sound is being played). For example, when placed in the kitchen, the listener may be able to hear sound output while cooking, but may be unable to hear the sound output (or may be able to faintly hear the sound) while in an adjacent living room. As a result, a person may intermittently hear the sound produced by the smart speaker as the person moves about the home (e.g., moving between the kitchen and the adjacent living room), which may adversely affect the person's listening experience since the person would only hear portions of the audio content. This may be especially the case when listening to a podcast or an audio book, of which the listener may miss important (or relevant) portions while moving in and out of the kitchen.

To solve this problem, the present disclosure describes an output device (e.g., a headset) that bridges audio playback with a playback device (e.g., smart speaker) to provide a user with a consistent listening experience. For example, while the smart speaker plays back audio content, the output device (which may be worn or held by a user who is in a vicinity of the playback device) may determine that the output device is moving away from the playback device. For example, the output device may be communicatively coupled via a wireless connection to the playback device, and determine that the output device is moving away based on a received signal strength indicator (RSSI) of the wireless connection. As another example, the determination may be based on a sound level (e.g., captured by a microphone of the output device) decreasing (or fading out), which may indicate that the output device is moving away. In response to determining that the output device is moving away from the playback device, the output device may playback the audio content as the output device moves away. In which case, sound produced by the output device may compensate for a reduction of sound produced by the playback device as perceived by the user of the output device that results from the user moving away from the playback device. As a result, the output device may maintain user-perceived audio playback, allowing for a consistent and pleasant listening experience.

FIG. 1 illustrates three stages 1-3 of a system 4 in which an (e.g., audio) output device 6 that is being worn by a user 10 is operating as an audio bridging device that is arranged to play back the same audio content that is being played back by a playback device 5 in order to maintain a sound level of the audio content as heard by the user while the user moves away from the playback device 5. As described herein, an "audio bridging device" may be any electronic device that may be configured to play back the same (similar or different) audio content that is being played back (e.g., into the ambient environment) by one or more playback devices (e.g., loudspeakers), in order for the bridging device to compensate for changes in audio playback of (e.g., changes in sound level of the audio content being played back by) the playback device 5 as perceived by a user who is moving away from and/or towards the playback device 5. In other words, the output device 6 compensates for changes to an apparent loudness of the played back audio content as perceived by the user. More about how the output device 6 bridges audio playback is described herein.

As shown, each stage in this figure shows a playback device 5, which is illustrated as a (e.g., stand-alone) loudspeaker and a user 10 who is wearing an output device 6, which is illustrated as a headset (e.g., open-back headphones) that is being worn on the user's head. As shown, the playback device 5 is playing back audio content (e.g., which is illustrated as lines expanding away from the device). Specifically, the playback device 5 may be using one or more audio signals, each of which having at least a portion of the audio content, to drive one or more speakers (e.g., integrated within a housing of the playback device 5) to produce (or project) sound of the (audio content contained within the) audio signal(s) into the ambient environment (e.g., a room 7 in which the playback device 5 is located). In one aspect, the audio content that the loudspeaker is playing back may be a piece of user-desired audio content, such as a musical composition, a podcast, an audio book, a movie soundtrack, etc. In one aspect, the content may be "user-desired" such that the (e.g., playback device 5 of the) system 4 has received user input (e.g., via a voice command, a selection of a physical button, etc.) to (e.g., begin) playback of the audio content through the playback device's speaker(s). In another aspect, the playback device 5 may begin playback in response to receiving instructions from another electronic device to which the device is communicatively coupled. For instance, the playback device 5 may receive instructions to playback audio content from the output device 6, which may have received user input (e.g., via a voice command). In one aspect, the playback device 5 may be streaming the audio content (e.g., from over the Internet) and/or may be retrieving the content from local memory of the device or from a remote memory device (e.g., a remote server). More about how the playback device 5 plays back audio content is described herein.

As shown, the headset includes a speaker 8 and a microphone 9 (which are a part of or integrated into a left housing or ear cup of the headset). As illustrated, the speaker is an "extra-aural" speaker that is arranged to project sound into the ambient environment. In one aspect, the headset may be arranged to allow sound from the ambient environment and/or sound produced by the extra-aural speaker to be heard by the user. Specifically, the headset may be designed to allow sound to pass through the ear cups and enter the user's ear. For example, the headset may be an open-back headphone that (e.g., has one or more openings that) allows sound from the ambient environment to pass through (e.g., a housing of) the headset into the user's ear.

Figure 2:
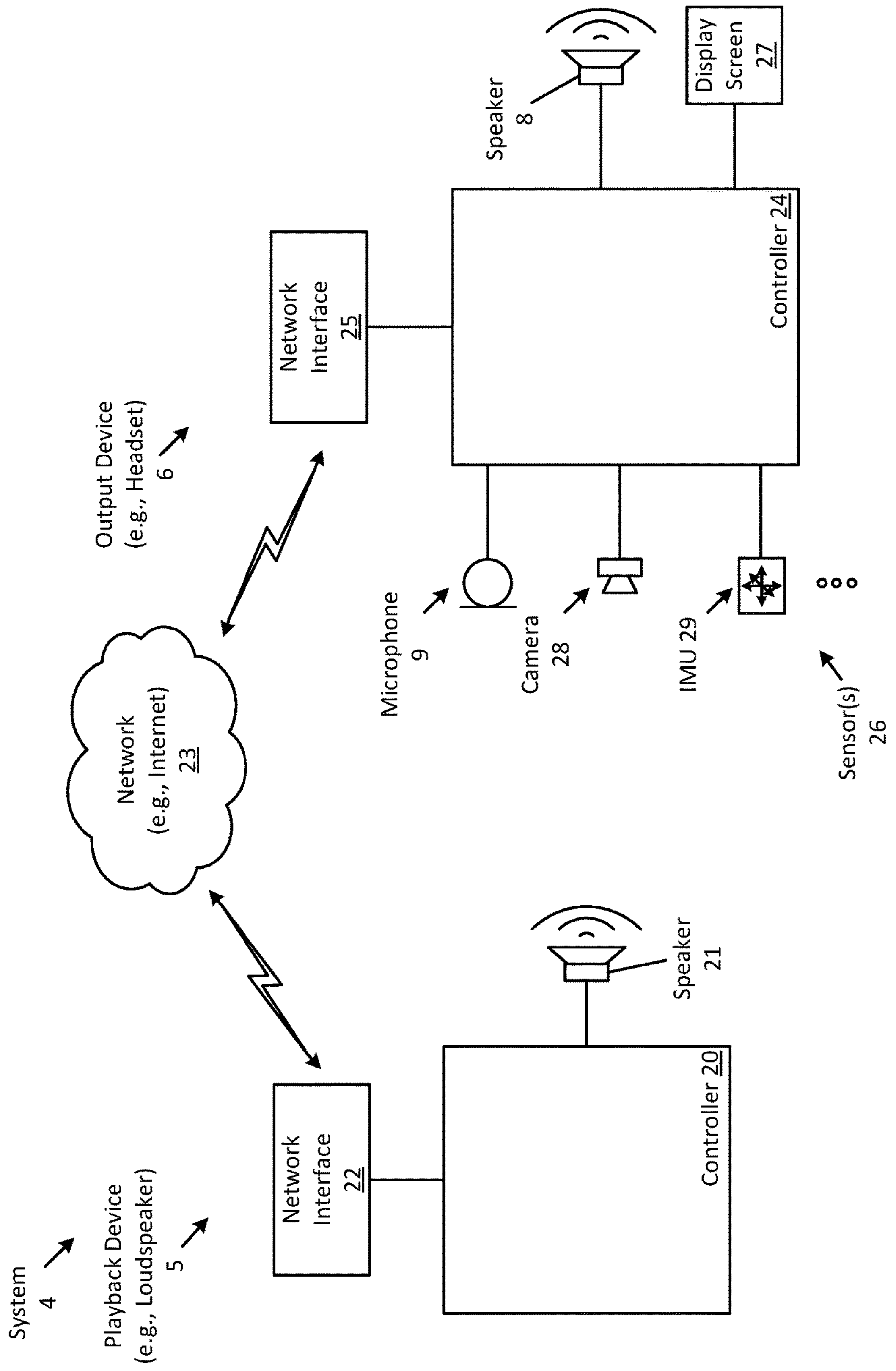
FIG. 2 shows the system that includes the playback device and the output device which are communicatively coupled to one another according to one aspect.

In another aspect, the output device 6 may perform one or more audio signal processing operations to allow ambient sound to be heard by the user. In which case, the speaker 8 may be an "internal" speaker, which is arranged inside the housing (e.g., ear cup) of the output device 6, and is arranged to project sound into (or towards) the user's ear. The output device 6 may perform a transparency function in which sound played back by the one or more internal speakers the output device 6 is a reproduction of the ambient sound that is captured by the device's microphone in a "transparent" manner, e.g., as if the output device 6 was not being worn by the user. The (e.g., controller, as illustrated in FIG. 2 of the) output device 6 may process at least one microphone signal captured by the microphone and filters the signal through a transparency filter, which may reduce acoustic occlusion due the audio output device 6 being on, in, or over the user's ear, while also preserving the spatial filtering effect of the wear's anatomical features (e.g., head, pinna, shoulder, etc.). The filter also helps preserve the timbre and spatial cues associated with the actual ambient sound. In one aspect, the filter of the transparency function may be user specific according to specific measurements of the user's head. For instance, the output device 6 may determine the transparency filter according to a head-related transfer function (HRTF) or, equivalently, head-related impulse response (HRIR) that is based on the user's anthropometrics. Thus, sound produced by the playback device 5 and/or the speaker 8 may be heard by the user via at least a portion of the output device 6.

In addition, each stage shows several sound levels (e.g., dB of sound pressure level (SPL)) of sounds produced by both devices, as perceived by the user. In particular, each stage shows the sound level 11 of the playback device 5 as heard by the user 10 (or as heard by a listener at the location of the listener) and the sound level 12 of the output device 6 as heard by the user 10. In one aspect, both of these levels represent the sound pressure of sound produced by both devices at (or near) the user's ear (or ears). In another aspect, these levels may represent sound pressure levels measured (or perceived) by one or more microphones (e.g., microphone 9) of the output device 6. In another aspect, these levels represent an amount (e.g., percentage) of sound produced by the respective devices that is being perceived by the user 10. In some aspects, the sound level 12 may be the same as a sound output level of the speaker 8. In another aspect, the sound level 12 may be less than the sound output level of the speaker, due to the speaker 8 being located a distance away from one or more of the user's ears. In which case, the sound output level of the speaker may be higher than that perceived by the user in order to compensate of the distance between the user's ears and the (e.g., diaphragm of the) speaker.

The first stage 1 shows the user 10 who is wearing the output device 6 is next to (e.g., within a threshold distance) of the playback device 5, and is primarily listening to sound that is being played back by the playback device 5 within the room 7. Specifically, the user is only (or primarily) listening to the playback device 5, while the output device 6 is not producing any (or is producing very little) sound (e.g., of the audio content that is being played back by the playback device 5). This is shown by the sound level 11 of the sound of the playback device 5 being high (e.g., at a maximum sound level threshold), while the sound level 12 is low (e.g., below a minimum sound level threshold). In one aspect, the sound level 12 in this stage may indicate that the output device 6 is not producing any sound of the audio content that is being played back by the playback device 5. In another aspect, although the output device 6 may not be playing back the audio content, the device may instead be producing other sounds.

In one aspect, sound level 11 may be a target sound level of the sound perceived by the user 10. Specifically, this may be the level at which the listener wishes to hear the sound being produced by the playback device 5. In one aspect, the target sound level may be defined when the playback device 5 begins audio playback. For example, the target sound level may correspond to a volume level of the playback device 5 when the device begins to output sound. In another aspect, the target sound level may be a sound level measured from a microphone signal captured by microphone 9. For instance, the sound level may be measured once the playback device 5 begins playback, as described herein. As another example, the sound level may be measured based on user input (e.g., at the output device 6). More about the target sound level is described herein.

The second stage 2 shows that the user 10 has moved away from the playback device 5 (e.g., beyond the threshold distance), but both are still in the same room (e.g., the user may be moving towards a door to exit the room). Specifically, the user is moving away from the playback device 5, while the playback device 5 continues to play back the audio content. As a result of being farther away, the sound level 11 has reduced (e.g., dropping to 25% of what the sound level was in the first stage 1). In one aspect, sound pressure from a point source may decrease by at least 50% as the distance between the playback device 5 and the user doubles. For example, if the distance between the user and the playback device 5 has doubled between the first stage 1 and the second stage 2, the sound level may have reduced by at least 6 dB.

In one aspect, upon determining that the output device 6 (and/or user) is moving away from the playback device 5, the output device 6 may be configured to (e.g., begin) playback of the audio content through speaker 8. Specifically, the output device 6 may playback the same audio content as the playback device 5 in order for a combined sound output of the playback device 5 and the output device 6 to maintain the (e.g., target sound level of the) sound level 11 in the first stage 1. To accomplish this, sound produced by the playback device 5 and sound produced by the speaker 8 may be synchronized as perceived by the user 10 of the output device 6. In which case, the user may be unable to discern or distinguish sound produced by the playback device 5 and/or sound produced by the output device 6, but instead perceive the sound of both devices as originating from a (e.g., same) sound source. This may be due to constructive interference of the sound produced by both devices at (or near) the listener's position (or more specifically at the user's ears).

As described herein, the output device 6 may playback audio content in order to compensate for a reduction of the sound level 11. As shown, with the user moving away from the playback device 5, the sound level 11 has decreased from when the user was closer to the device in the first stage. In which case, the output device 6 has adjusted a sound output level of the sound produced by the speaker 8 based on the change to the sound level 11. For example, the output device 6 may (e.g., begin audio playback and/or) apply a volume adjustment (e.g., increasing the volume) in order to increase sound output, as shown in this figure by the curved lines emanating from the speaker 8. As a result, the sound level 12 has increased from a lower level, as shown in the first stage 1. In one aspect, the increase may be based on a difference between the target sound level 11 of stage 1 and the (current or new) the sound level 11 in the second stage 2. In particular, the output device 6 increased sound level 12 proportionally as the sound level 11 has decreased. Thus, the combination of sound level 12 and 11 in the second stage 2 is equal to (or approximate to) the sound level 11 of stage 1. As a result, the user may not perceive a change in (an apparent) sound level as the user moves away from the playback device 5. More about how the output device 6 compensates sound output is described herein.

The third stage 3 shows that the user is no longer within the room 7 that includes the playback device 5 (e.g., has moved beyond a threshold distance). Specifically, the user has moved outside the building 13 that houses the playback device 5 that is continuing to playback the audio content. As a result of moving far away from the playback device 5, the sound level 11 of the playback device 5 is not heard (or is faintly heard) by the user (e.g., the user has moved outside an acoustic audible range of the playback device 5). In addition, the sound level 12 of the output device 6 has increased in order to compensate for the low sound level of the playback device 5, which is shown in this figure as the number of curved lines emanating from the speaker 8 has increased from the number of lines in the second stage 2. Specifically, the output device's sound level is now the same (or similar) to the sound level 11 in stage 1. Thus, throughout the stages 1-3, the combination of sound levels 11 and 12 are the same (e.g., defined by the target sound level in the first stage 1), and therefore the user perceives a continuous and uninterrupted sound level of the audio content as the user moves away from the playback device 5.

As described thus far, the output device 6 may increase sound output in order to compensate for a reduction to the sound level 11 as the user moves away from the playback device 5. In one aspect, the output device 6 may decrease sound output as the user moves towards the playback device 5. In which case, as the user moves towards the playback device 5, the sound level 11 increases and therefore the output device 6 may reduce a sound output level of the speaker in order to reduce the sound level 12 of the sound perceived by the user.

FIG. 2 shows the system 4 that includes the playback device 5 and the output device 6 which are communicatively coupled to one another according to one aspect. In one aspect, the playback device 5 may be any electronic device that is configured to playback audio content and/or perform networking operations. As shown, the playback device 5 is a loudspeaker. In another aspect, the playback device 5 may include a stand-alone speaker, a smart speaker, (an element that is a part of) a home theater system, or an infotainment system that is integrated within a vehicle. In another aspect, the playback device 5 may be a desktop computer, a laptop computer, a digital media player, a television, etc. In one aspect, the device 5 may be a portable electronic device (e.g., being handheld operable), such as a tablet computer, a smart phone, etc.

As shown, the playback device 5 includes a controller 20, a network interface 22, and a speaker 21. In one aspect, the playback device 5 may include more or fewer elements, such has having two or more speakers. In one aspect, the network interface 22 is configured to establish a (e.g., wireless) communication link (or connection) with one or more other electronic devices, such as the output device 6, in order to exchange digital data. In one aspect, the speaker 21 may be an electrodynamic driver that may be specifically designed for sound output at certain frequency bands, such as a woofer, tweeter, or midrange driver, for example. In one aspect, the speaker 21 may be a "full-range" (or "full-band") electrodynamic driver that reproduces as much of an audible frequency range as possible. In one aspect, the speaker 21 is an extra-aural speaker that is configured to output sounds into the ambient environment. In one aspect, the speaker 21 may be an "in-device" speaker that is integrated into (e.g., a housing) of the playback device 5. For example, when the playback device 5 is a television, the device may include one or more speakers integrated into the television.

The controller 20 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller is configured to perform audio signal processing operations and/or networking operations. For instance, the controller 20 may be configured retrieve (e.g., one or more audio signals that includes) audio content (e.g., from over the network 23, via the network interface 22), and use the audio signals to drive the speaker 21 to output sounds of the audio content. In another aspect, the controller is configured to perform networking operations, such as communicating (via the network 23) to the output device 6. More about the operations performed by the controller 20 is described herein.

As illustrated in FIG. 1, the output device 6 may be a headset that is designed to be worn on (e.g., a head of) or by a listener (e.g., user 10). In another aspect, the output device 6 may be any electronic device that includes at least one speaker (and includes at least one microphone) and is configured to playback audio content by driving the speaker with one or more audio signals. For instance, the device 6 may be a wireless headset (e.g., in-ear headphones or earbuds) that are designed to be positioned on (or in) a user's ears, and are designed to output sound into the user's ear canal. In some aspects, the earphone may be a sealing type that has a flexible ear tip that serves to acoustically seal off the entrance of the user's ear canal from an ambient environment by blocking or occluding in the ear canal. In which case, the output device 6 may include a left earphone for the user's left ear and a right earphone for the user's right ear. In this case, each earphone may be configured to output at least one audio channel of media content (e.g., the right earphone outputting a right audio channel and the left earphone outputting a left audio channel of a two-channel input of a stereophonic recording, such as a musical work). In another aspect, the output device 6 may be any electronic device that includes at least one speaker and is arranged to be worn by the user and arranged to output sound by driving the speaker with an audio signal. As another example, the output device 6 may be any type of headset, such as an over-the-ear (or on-the-ear) headset that at least partially covers the user's ears and is arranged to direct sound into the ears of the user.

In another aspect, the output device 6 may be any type of wearable electronic device that is configured to playback audio content. For example, the output device 6 may be a pair of smart glasses or a smart watch. In another aspect, the output device 6 may be a device similar to those devices described with respect to the playback device 5. For instance, the output device 6 may be a smart phone. In another aspect, the output device 6 may be a hearing aid device that is configured to produce amplified ambient sounds into the ear (e.g., canal) of a user.

As shown, the output device 6 includes a controller 24, one or more sensors 26 that includes the microphone 9, a camera 28, and an inertial measurement unit (IMU) 29, the speaker 8, and a display screen 27. In one aspect, the output device 6 may include more or fewer elements. For example, the output device 6 may include more sensors (e.g., a temperature sensor, an accelerometer, a proximity sensor, etc.). In another aspect, the output device 6 may include two or more elements, such as having two or more microphones, speakers, and/or display screens.

In one aspect, the one or more sensors 26 are configured to detect the environment (e.g., in which the output device 6 is located) and produce sensor data based on the environment. The microphone 9 may be any type of microphone (e.g., a differential pressure gradient micro-electro-mechanical system (MEMS) microphone) that is configured to convert acoustical energy caused by sound wave propagating in an acoustic environment into a microphone signal. As described herein, the microphone 9 may be a (e.g., reference) microphone that is arranged to sense ambient sounds. In another aspect, the microphone 9 may be an error (or internal) microphone that is arranged to capture sounds within a user's ear canal, while the output device 6 is being worn by the user. In some aspects, the output device 6 may include at least one of both types of microphones.

In one aspect, the camera 28 is a complementary metal-oxide-semiconductor (CMOS) image sensor that is capable of capturing digital images including image data that represent a field of view of the camera, where the field of view includes a scene of an environment in which the device 6 is located. In some aspects, the camera may be a charged-coupled device (CCD) camera type. The camera is configured to capture still digital images and/or video that is represented by a series of digital images. In one aspect, the camera may be positioned anywhere about the device. In some aspects, the device may include multiple cameras (e.g., where each camera may have a different field of view). The IMU 29 may be an electronic device that is designed to measure the position and/or orientation of the output device 6.

The display screen 27 (or display) is designed to present (or display) digital images or videos of video (or image) data. In one aspect, the display screen 27 may use liquid crystal display (LCD) technology, light emitting polymer display (LPD) technology, or light emitting diode (LED) technology, although other display technologies may be used in other aspects. In some aspects, the display 27 may be a touch-sensitive display screen that is configured to sense user input as input signals. In some aspects, the display may use any touch sensing technologies, including but not limited to capacitive, resistive, infrared, and surface acoustic wave technologies.

As described herein, each of the devices may include one or more elements. In one aspect, at least some of the elements may be a part of (or integrated within) a housing of each respective device. In another aspect, either of the devices may include one or more elements described herein. For example, the playback device 5 may include one or more display screens, one or more microphones, and/or one or more cameras. In another aspect, rather than (or in addition to) having elements integrated within each device, one or more of the elements may be separate electronic devices that are communicatively coupled (e.g., via the network interfaces) with the controllers. For instance, the microphone 9 may be (a part of) a separate device that is (e.g., wirelessly)

communicatively coupled to the controller 24, which transmits one or more microphone signals (as audio digital data) to the controller.

In one aspect, the output device 6 may be configured to communicatively couple with the playback device 5, via the network 23, such that both devices may be configured to communicate with one another. In one aspect, the network may be any type of computer network, such as a wide area network (WAN) (e.g., the Internet), a local area network (LAN), etc., through which the devices may exchange data between one another and/or may exchange data with one or more other electronic devices, such as a remote electronic server. In another aspect, the network may be a wireless network such as a wirelessly local area network (WLAN), a cellular network, etc., in order to exchange digital (e.g., audio) data. With respect to the cellular network, the output device 6 may be configured to establish a wireless (e.g., cellular) call, in which the cellular network may include one or more cell towers, which may be part of a communication network (e.g., a 4G Long Term Evolution (LTE) network) that supports data transmission (and/or voice calls) for electronic devices, such as mobile devices (e.g., smartphones). In another aspect, the devices may be configured to wirelessly exchange data via other networks, such as a Wireless Personal Area Network (WPAN) connection. For instance, the output device 6 may be configured to establish a wireless connection with the playback device 5 via a wireless communication protocol (e.g., BLUETOOTH protocol or any other wireless communication protocol). During the established wireless connection, the devices may exchange (e.g., transmit and receive) data packets (e.g., Internet Protocol (IP) packets) with the digital (e.g., audio) data, which may include a representation of audio content that is being played back by the playback device 5.

As described herein, the controllers 20 and/or 24 are configured to perform digital signal processing operations, such as audio signal processing operations and networking operations. In one aspect, operations performed by the controllers may be implemented in software (e.g., as instructions stored in memory and executed by either controller) and/or may be implemented by hardware logic structures as described herein.

Figure 3:
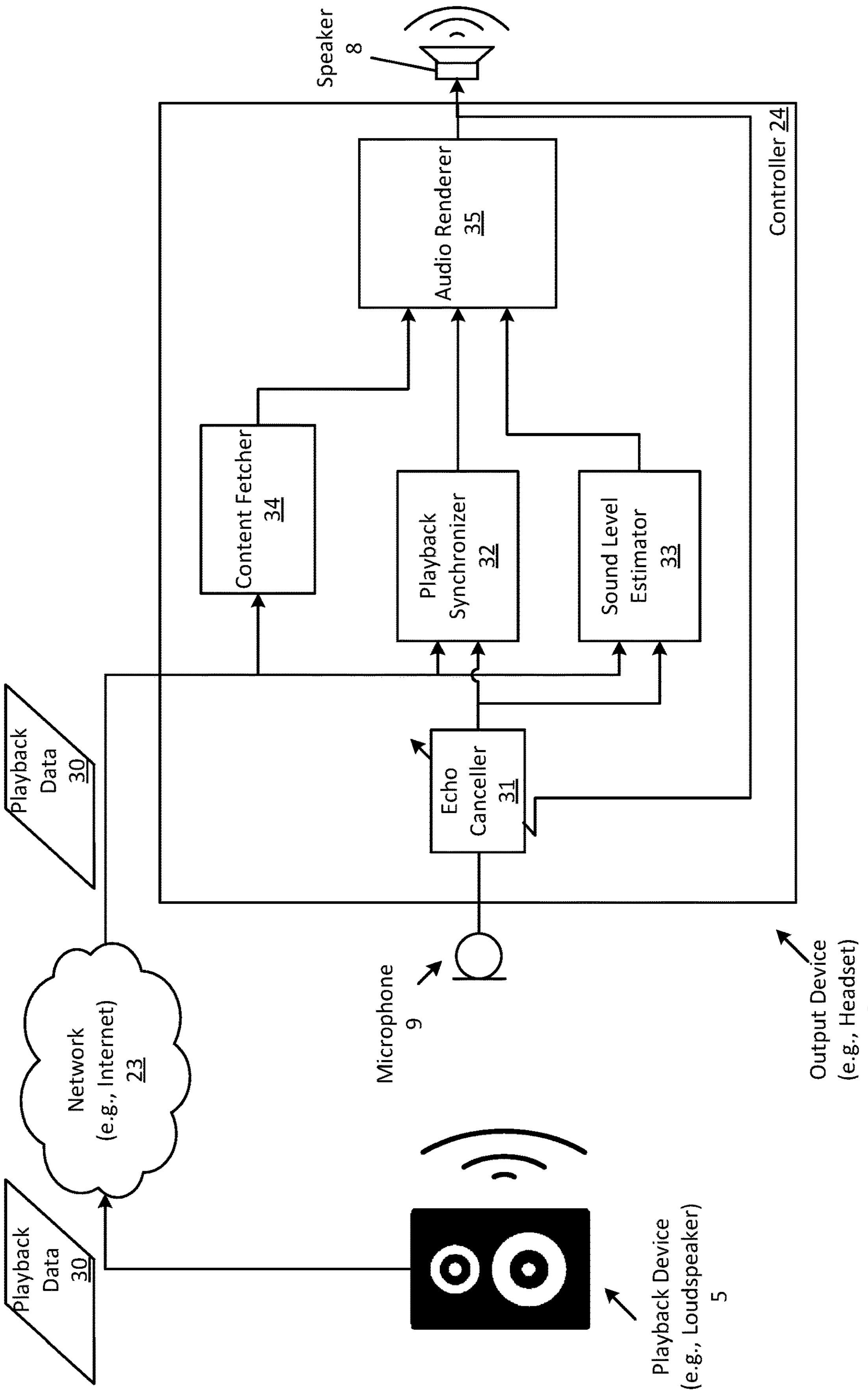
FIG. 3 shows a block diagram of the output device that is bridging audio playback with a playback device.

FIG. 3 shows a block diagram of the output device 6 that is bridging audio playback with the playback device 5. Specifically, the output device 6 is playing back audio content through speaker 8 that is also being played back by the playback device 5 (e.g., through speaker 21, as shown in FIG. 2) in order to maintain a (e.g., target) sound level of the audio content as perceived by the user of the output device 6. In one aspect, the operations described herein, may be performed while the user 10 who is holding or wearing the output device 6 is (e.g., going to or is) moving away from (or towards) the playback device 5.

As shown, the playback device 5 is playing back a piece of audio content by driving one or more speakers (e.g., speaker 21) with one or more audio signals that include the audio content. In one aspect, the playback device 5 may be playing back the audio content based on user instructions. For instance, the playback device 5 may have received user input (e.g., from user 10 of the output device 6) to initiate playback. For example, the playback device 5 may have received the user input via one or more input devices, such as one or more (e.g., physical) buttons of the playback device 5. In another aspect, the playback device 5 may receive a voice command (e.g., captured by a microphone of the playback device 5) of the user to playback audio content. In which case, the (e.g., controller 20 of the) playback may analyze a microphone signal of the microphone to detect speech contained therein. Once detected, the controller may determine whether the speech includes the voice command (e.g., to playback audio content). If so, the playback device 5 may begin playback. In another aspect, the user input may have been received via a user selection of a user interface (UI) item displayed in a graphical user interface (GUI) on a display screen (not shown), which when selected transmits a control signal to the controller to playback the audio content.

As described thus far, the playback device 5 may receive user input via one or more input devices that are coupled to the playback device 5. In another aspect, user input may be received from another electronic device that is communicatively coupled to the playback device 5. For example, the output device 6 may receive user input for instructing the playback device 5 to (e.g., begin) audio playback. Returning to a previous example, the user may select a UI item displayed in a GUI on the display screen 27. Once selected, the output device 6 may transmit a control message (e.g., via the network 23) to the playback device 5, instructing the controller 20 to begin (or resume) streaming audio content (e.g., from over the network 23) for playback.

The controller 24 include one or more operational blocks for performing audio signal processing operations for bridging audio content playback with the playback device 5. For example, the controller includes an echo canceller 31, a playback synchronizer 32, a sound level estimator 33, a content fetcher 34, and an audio renderer 35. As shown, the controller 24 is configured to receive playback data 30 (via the network 23) from the playback device 5. For instance, while (or before) the playback device 5 plays the audio content, the device may establish a (e.g., wireless) connection with the output device 6, and transmit playback data, as one or more data (e.g., Internet Protocol (IP)) packets. In one aspect, the playback data may be (or include) a representation of the audio content. In particular, the data may include metadata that describes of the audio content, such as an identification of the audio content. For example, when the audio content is a musical composition, the identification may describe the composition, such as including a title, genre, artist, etc., of the musical composition. In another aspect, the identification may be a unique identifier that uniquely identifies the audio content.

In another aspect, the playback data may include a (e.g., current) playback state of the audio content that is being played back by the playback device 5. In one aspect, the playback state may indicate whether the audio content is currently being played by the playback device, or whether the audio content has been paused or stopped (e.g., based on user input). For example, when the playback data indicates that the content has been paused or stopped, the output device 6 may pause or stop playback as well. In another aspect, the playback state may include one or more timestamps that indicate timing characteristics of the audio content that is being played back by the playback device 5. For example, the playback state may include a content-time timestamp of a portion of the audio content (or a future portion of the audio content) that is to be (or is being) played back by the playback device 5. For instance, the content-time timestamp may indicate a playback time with respect to a whole playback duration of the audio content (e.g., the timestamp indicating that a portion of the audio content that is to be played back is at a two-minute mark of a musical composition that has a three-minute long playback duration).

In another aspect, the playback state may include a content-start timestamp that may indicate a start time (e.g., a moment at which the playback device 5 and/or output device 6 has commenced or begun playback of the audio content). In some aspects, the start time may be with respect to (or be defined by) a shared clock between both devices, which allows both devices to synchronize playback (e.g., as perceived by one or more listeners, as described herein). In one aspect, both devices may synchronize or share (e.g., internal) clocks via any time-synchronization method. For example, to synchronize clocks the devices may exchange synchronization messages, which may be included within or separate from the playback data (e.g., included within the content-start timestamp), using any timesync protocol (e.g., IEEE 802.1AS protocol). In another aspect, the devices may synchronize internal clocks using information both devices obtain (e.g., via the Network 23) from a Network Time Protocol (NTP) server. In some aspects, the devices may synchronize clocks in response to the playback device 5 receiving user input to initiate (or playback) the audio content.

In some aspects, the playback state may include a current playback timestamp that indicates a time along the shared clock at which a portion of the audio content is to be (or is being) played back by the playback device 5. Specifically, the current playback timestamp may indicate when a portion of the audio content, which may be associated with the playback state is to be played back with respect to the shared clock. For instance, the current playback state may associate the time along the shared clock with the content-time timestamp, in that the current playback timestamp indicates when the portion of the audio content that is associated with one or more content-time timestamps is to be played back long the shared clock. In one aspect, one or more of the timestamps described herein may allow the output device 6 to synchronize playback with the playback device 5 (e.g., as perceived by one or more listeners).

In another aspect, the playback state may indicate other characteristics of the audio content (and/or playback device 5). For example, it may include a volume level (or a sound output level) of the audio content that is being played back by the playback device 5. Specifically, the volume level may be a user-defined volume level at which a listener wishes to hear sound output of the playback device 5. In another aspect, the characteristics may indicate audio signal processing operations that are being performed upon (e.g., one or more audio signals of) the audio content that is being played back, such as whether equalization operations or dynamic range compression are being performed. In another aspect, in addition to (or in lieu of) including at least some of the data described herein, the playback data 30 may include (at least a portion of) the audio content that is being (or will be) played back by the playback device 5. For instance, the playback data may include one or more audio signals (e.g., as digital audio data) of the audio content, in any audio format.

As described thus far, the playback data 30 may be received by the output device 6 from the playback device 5. For instance, once the playback commences, the playback device 5 may begin transmitting playback data 30. In some aspects, the playback device 5 may transmit playback data while playing back audio content. In another aspect, at least some data of the playback data 30 may be received by the output (and/or playback device 5) by one or more other devices. For instance, either of the devices may receive playback data from an electronic remote server, which may be configured to stream the audio content to the devices. In which case, the server may transmit one or more timestamps, metadata regarding the audio content, and/or characteristics.

The content fetcher 34 is configured to receive the playback data 30, and is configured to fetch (or retrieve) audio content that is associated with the playback data. As described herein, the playback data may include an identifier associated with the audio content that is being played back by the playback device 5, and may include a (e.g., content-time) timestamp that indicates a portion of the audio content that is (or is going to be) played back by the playback device 5. The content fetcher 34 may use (at least a portion of) this information to retrieve (e.g., one or more audio signals of) the audio content that is (or is going to be) played back by the playback device 5. In one aspect, the content fetcher 34 may retrieve the audio signal(s) from a remote electronic device (e.g., a remote server via the network 23) and/or from local memory of the first electronic device. In one aspect, the content fetcher 34 may supply the retrieved one or more audio signals of the audio content to the audio renderer 35, which may use the one or more audio signals to drive the speaker 8 to produce sound of the audio content. More about how the audio renderer 35 is described herein.

The echo canceller (or canceller) 31 is configured to receive at least one microphone signal from the microphone 9 that includes ambient sound captured by the microphone, which may include sound of the audio content produced by the playback device 5, and is configured reduce (or cancel) linear components of echo from the microphone signal, which may be caused by sound produced by the speaker 8. As described herein, the output device 6 may be configured to playback the audio content through the speaker 8. Along with capturing sound produced by the playback device 5, the microphone may also capture the sound produced by the speaker 8. Thus, the echo canceller 31 performs an acoustic echo cancellation process upon the microphone signal using the audio signal (or driver signal) used by the audio renderer 35 to drive the speaker 8 as a reference input, to produce a linear echo estimate that represents an estimate of how much of the driver signal (output by the speaker 8) is in the microphone signal produced by the microphone 9. In one aspect, the canceller 31 determines a liner filter (e.g., a finite impulse response (FIR) filter), and applies the filter to the driver signal to generate the estimate of the linear echo, which is subtracted from the microphone signal. The resulting echo canceled signal may include the sound produced by the playback device 5. In some aspects, the echo canceller 31 may use any method of echo cancellation.

The playback synchronizer 32 is configured to synchronize playback of the output device 6 with playback of the playback device 5. Specifically, the synchronizer 32 determines (or estimates) a time alignment for playing back the audio content such that sound of the audio content produced by the speaker 8 arrives at (or approximately) the same time as sound of the playback device 5 at the user's location, such that playback of both devices is synchronized as perceived by the user of the output device 6 (e.g., sound produced by both devices constructively interfering with each other). Thus, the controller 24 may use the estimated time alignment for synchronizing (e.g., future) portions of the audio content played back by the output device 6 with same portions that are played back by the playback device 5.

In one aspect, the time alignment accounts for time it takes for sound produced by the playback device 5 to reach (and/or to be heard by) the user 10 of the output device 6. Specifically, the time is an acoustic time-of-flight (ToF) which is a period of time it takes for sound produced by the playback device 5 to travel through the ambient environment and arrive at the (e.g., microphone 9 of the) output device 6. As a result, the output device 6 may playback the audio content later than the playback device 5 according to the time alignment, such that sound of both devices reaches the user at (approximately) the same time. Thus, the listener perceives synchronous playback of the devices, while both devices actually play back the audio content asynchronously. More about synchronous playback is described herein.

In one aspect, the synchronizer 32 is configured to receive (at least a portion of) the playback data 30, which indicates the current playback state of the audio content that is being played back by the playback device 5. For example, the playback state may include a current playback timestamp that indicates a time along a shared clock between the devices at which a portion of the audio content (e.g., a long a playback duration of the audio content) is being played back by the playback device 5. In another aspect, the synchronizer 32 may receive (at least a portion of) the retrieved audio content (e.g., as at least one audio signal) from the content fetcher 34. Specifically, the playback synchronizer 32 may receive the portion of the audio content that is associated with the (e.g., current playback state of the) playback data. For example, the received audio content may be the portion that is to be played back by the playback device 5, according to the current playback state. In one aspect, the received audio content may span a period of time (e.g., one second, one minute, etc.) that includes (or begins at) a time along a playback duration of the audio content that is associated with the received playback data. In particular, the received audio content may begin at a time that is associated with a content-time timestamp associated with the current playback state of the playback data. In another aspect, the synchronizer 32 may receive the (echo canceled) microphone signal that includes captured sound of the ambient environment (e.g., along with sound of the audio content produced by the playback device 5).

In one aspect, the synchronizer 32 uses (at least some) of the received data to determine (or estimate) the acoustic ToF. Specifically, the output device 6 may receive the playback data 30 indicating that the playback device 5 is to playback a portion of the audio content immediately with respect to devices' shared clock (e.g., according to the playback state associated with the playback data). Sound produced by the playback device 5, however, may arrive at the output device 6 later than the received playback data, due to the acoustic transmission time being greater than a transmission time through the network (e.g., via a BLUETOOTH connection). In one aspect, the synchronizer 32 may compare (e.g., spectral content of) the (e.g., echo canceled) microphone signal with the audio signal of the audio content that is retrieved by the content fetcher 34 to determine whether spectral content (e.g., at least partially) of the audio signal matches the spectral content of the microphone signal. In one aspect, a match may be determined based on the compared spectral content at least partially matching (e.g., at least matching within a threshold value). Upon identifying a match, meaning that the sound produced by the playback device 5 has now reached the (e.g., microphone of the) output device 6, the synchronizer 32 may determine a current time of the shared clock. With the current time, the synchronizer 32 may determine the acoustic ToF based on a difference between the current playback timestamp of the playback data and the current time of the shared clock. In one aspect, the acoustic ToF may be the determined difference. As an example, the playback state may indicate that a portion of the audio content is to be played back at $T_0$ of the shared clock. At $T_1$, which is after $T_0$, the output device 6 may determine that the sound of the portion of the audio content has reached the output device 6 (e.g., based on a comparison of the microphone signal and retrieved audio content. Thus, in this example, the acoustic ToF may be (or be based on) $T_1-T_0$.

In another aspect, the playback synchronizer 32 may determine (or estimate) the acoustic ToF through other methods. Specifically, the output device 6 may estimate the acoustic ToF based on a determined (or estimated) distance between the output device 6 and the playback device 5. In one aspect, the synchronizer 32 may determine the distance based on sensor data from one or more sensors 26. For example, the synchronizer 32 may obtain image data captured by the camera and perform object recognition upon the image data to determine whether (at least a portion of) the playback device 5 is within the image data (e.g., within a field of view of the camera). In response to determining that the playback device 5 is within the image data, the synchronizer may determine the distance based on the image data. In another aspect, the synchronizer may determine the distance from the playback device 5 based on motion data (e.g., of the IMU 29) and/or location data. For example, the sensors 26 may include a Global Positioning System (GPS) sensor (not shown) that may produce location data that indicates a location of the output device 6. In one aspect, the playback data may include location data of the playback device 5. In which case, the output device 6 may determine the distance between the devices based on the location data, and from the distance, estimate the acoustic ToF. In another aspect, the distance between the devices may be determined based on a wireless connection between the two devices. For instance, the output device 6 may determine a position of the device with respect to the playback device 5 based on a received signal strength indicator (RSSI) of the wireless connection.

In another aspect, the ToF may be determined based on differences between the sound level of the microphone signal and the (target) sound level of the playback data 30. As described herein, sound output may dissipate within an environment with respect to distance. Thus, the synchronizer 32 may estimate the acoustic ToF based on a difference between the sound level of the playback data (e.g., the volume level of the playback device 5) and the (current) sound level of the sound produced by the playback device 5 that is captured by the microphone. In another aspect, the playback synchronizer 32 may determine the acoustic ToF through other methods.

In one aspect, the playback synchronizer 32 may determine a time alignment for playing back the audio content using the acoustic ToF. In one aspect, the time alignment may be the same as the acoustic ToF. In another aspect, the time alignment may be based on the ToF. For example, the time alignment may account for the acoustic ToF in addition to a distance between the microphone 9 and the speaker 8.

In one aspect, the sound level estimator 33 is configured to maintain a constant (or consistent) sound level (or an apparent audio loudness) of the sound of the audio content as perceived by the user of the output device 6. Specifically, the estimator 33 is configured to determine a target sound level of the audio content that is to be perceived by the user. In one aspect, the estimator 33 may determine the target sound level based on the playback data. For example, the estimator 33 may determine the target level as the volume level at which the playback device 5 is (currently) playing back the audio content.

In another aspect, the target level may be user-defined. For instance, the user of the output device 6 may define the target level based on user input (e.g., by defining a user-defined volume level). In another aspect, the target sound level may be defined based on when the playback device 5 has begun audio playback. For example, once the playback device 5 begins audio playback (e.g., of a particular piece of user-desired audio content), the playback device 5 may transmit (e.g., an initial) playback data. From this initial playback data, the sound level estimator 33 may define the target sound level. In another aspect, the target sound level may be based on when the playback device 5 has commenced a particular audio playback session (e.g., based on when the playback device 5 has been turned on and commenced audio playback).

In another aspect, the target sound level may be estimated based on a microphone signal of the microphone 9. For instance, upon determining that playback has commenced, the sound level estimator 33 may define the target sound level based on an initial portion of audio content that is played back by the playback device 5 that is captured by the microphone. In another aspect, the target sound level may be based on (e.g., a relationship between) the volume level of the playback device 5 and a sound level of the microphone signal.

The sound level estimator 33 receives the (e.g., echo canceled) microphone signal captured by the microphone 9 and determines a level adjustment based on the microphone signal and the playback data 30. Specifically, the estimator 33 determines a sound level of sound of the audio content played by the playback device 5 at the microphone, using the microphone signal, and determines (estimates) a level (e.g., volume) adjustment for the output device 6 based on the determined sound level and the target sound level of the playback data. In particular, the estimator 33 may determine a volume adjustment that satisfies (e.g., maintains) the target sound level based on the determined sound level. For example, upon determining that the sound level is less than the target sound level, the estimator 33 may determine that the volume of the output device 6 is to be increased in order to compensate for the drop in sound level. In particular, the estimator 33 may determine a (e.g., scalar) gain that is to be applied to one or more audio signals of the audio content that is are to be used to drive the speaker 8.

In another aspect, the sound level estimator 33 may determine that the volume level is to be decreased based on the sound level of the microphone signal increasing. For instance, the estimator 33 may determine that the sound level at the microphone is increasing (e.g., having increased from a previous estimation of the sound level), which may be due to the user moving closer to the playback device 5. As a result, in order to maintain the target sound level, the estimator 33 may determine a reduction to the volume level (e.g., an attenuation to the audio signal of the audio content). Thus, the sound level estimator 33 may dynamically adjust the sound output level of the speaker 8 in order to maintain the target sound level heard by the user of the output device 6.

The audio renderer 35 is configured to receive the (e.g., one or more audio signals that include the) audio content from the content fetcher 34, and is configured to use the one or more audio signals to drive the speaker 8 so that sound of the audio content is perceived by the user of the output device 6 simultaneously as the sound of the playback device 5. In another aspect, the audio renderer 35 receives the time alignment from the playback synchronizer, and uses the time alignment to synchronize playback with the playback device 5. In particular, the audio renderer 35 may delay playback of the audio content (e.g., and future audio content) by a period of time (e.g., with respect to the shared clock) as indicated by the time alignment. For example, the audio renderer 35 may receive a portion of the audio content that is being played back immediately (e.g., indicated by the playback data) by the playback device 5, and playback the portion after the period of time indicated by the time alignment.

In another aspect, the audio renderer 35 is configured to receive a level adjustment from the sound level estimator 33, and is configured to apply one or more audio signal processing operations upon the audio content based on the level adjustment. For example, the audio renderer 35 may apply a scalar gain (or gain value) upon (at least a portion of) the audio signal to adjust (e.g., reduce or increase) a level (or magnitude) of the audio signal. In one aspect, the renderer 35 may apply the gain adjustment in the analog domain (e.g., when the signal is an analog signal). In another aspect, the gain may be applied in the digital domain (e.g., when the signal is a digital audio signal). In one aspect, the audio renderer 35 may adjust certain portions of the audio signal, such as certain frequencies. In another aspect, the renderer 35 may apply one or more gain values upon portions of the audio signal by performing audio compression operations, such as Dynamic Range Compression (DRC). In another aspect, the audio renderer 35 may apply other signal processing operations, such as equalization operations upon (e.g., spectrally shaping) the audio signal, based on the level adjustment.

In one aspect, the audio renderer 35 may spatially render the audio content such that the sound produced by the output device 6 is perceived by the user of the device to originate from a location within space. In one aspect, the audio renderer 35 may be configured to determine spatial characteristics (e.g., azimuth, elevation, frequency, etc.) that indicates a position in space at which sound of the audio content is to be reproduced (e.g., as a virtual sound source). In one aspect, the audio renderer 35 may determine spatial characteristics in order to reproduce the sound at the location of the playback device 5. Specifically, the audio renderer 35 may be configured to determine a location of the playback device 5 with respect to the output device 6. For example, the renderer 35 may use data from the playback data 30 (e.g., location data of the playback device 5), and/or location data determined by the controller 24 of the playback device 5 with respect to the output device 6. From this data, the renderer 35 may determine (or estimate) the spatial characteristics, and may use the characteristics to select one or more spatial filters, such as Head-Related Transfer Functions (HRTFs), or equivalently one or more Head-Related Impulse Responses (HRIR), which when applied to the audio signal of the audio content produce spatial audio (e.g., binaurally rendered audio signals). Thus, the renderer 35 may spatially render the audio content according to the location of the playback device 5 to produce a virtual sound source that includes the audio content through the speaker 8. In one aspect, the output device 6 may include at least one other speaker, with which the output device 6 may use to drive the binaurally rendered audio signals.

In some aspects, the audio renderer 35 may perform other audio signal processing operations. For example, when the output device 6 includes two or more speakers, the audio renderer 35 may perform sound-output beamformer operations to project one or more sounds towards particular locations in space. In another aspect, the renderer 35 may perform an active noise cancellation (ANC) function to cause the speaker 8 to produce anti-noise in order to reduce ambient noise from the environment that is leaking into the user's ears. The ANC function may be implemented as one of a feedforward ANC, a feedback ANC, or a combination thereof. As a result, the controller 24 may receive a reference microphone signal from a microphone that captures external ambient sound. In another aspect, the controller 24 may perform any ANC method to produce the anti-noise.

In another aspect, the controller 24 may include a sound-pickup beamformer that can be configured to process the audio (or microphone) signals produced two or more external microphones of the output device 6 to form directional beam patterns (as one or more audio signals) for spatially selective sound pickup in certain directions, so as to be more sensitive to one or more sound source locations. For instance, the controller may use the sound-pickup beamformer to capture sound produced by the playback device 5.

Figure 4:
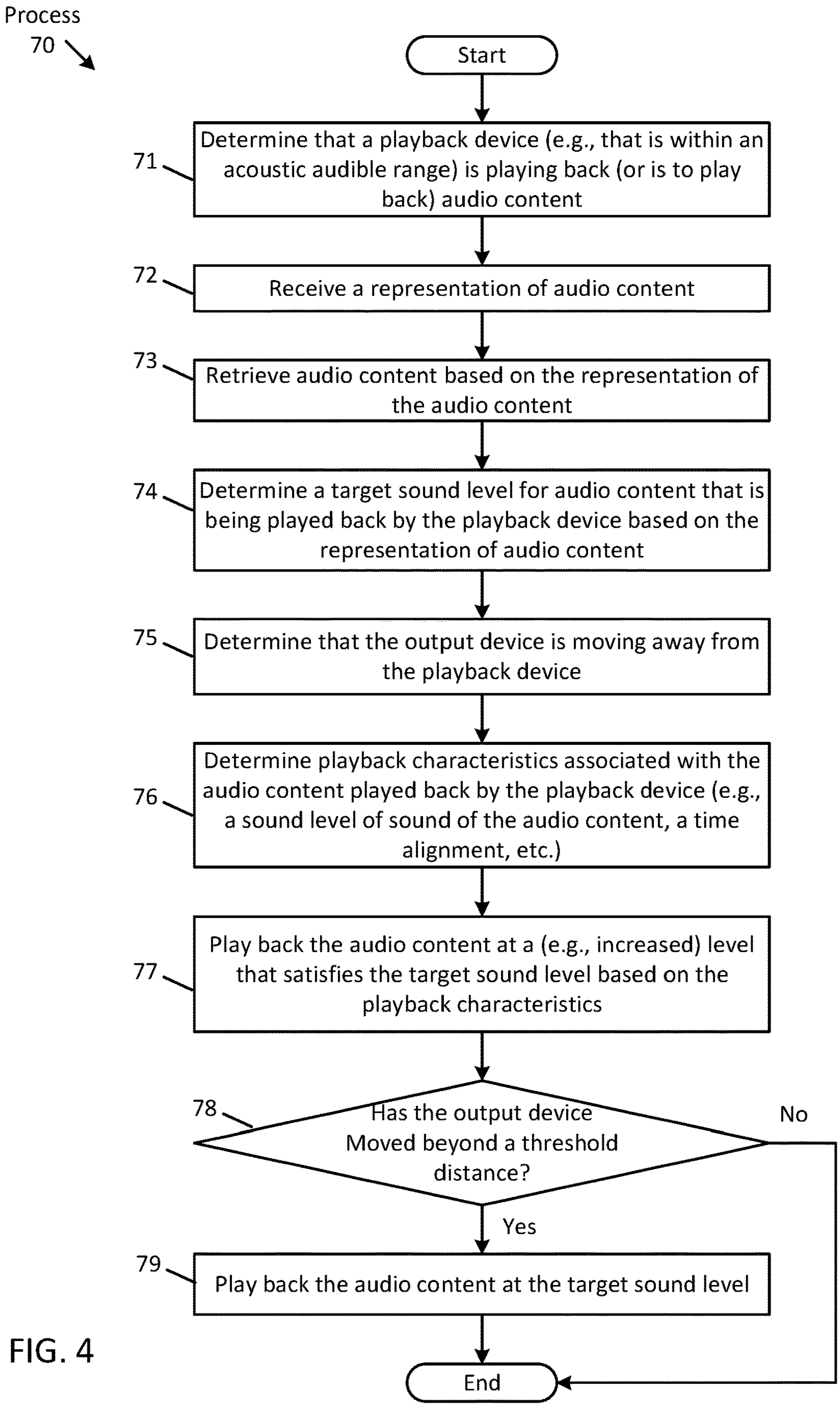
FIG. 4 is a flowchart of one aspect of a process for the output device to bridge audio playback with the playback device while the output device moves away from the playback device.
Figure 5:
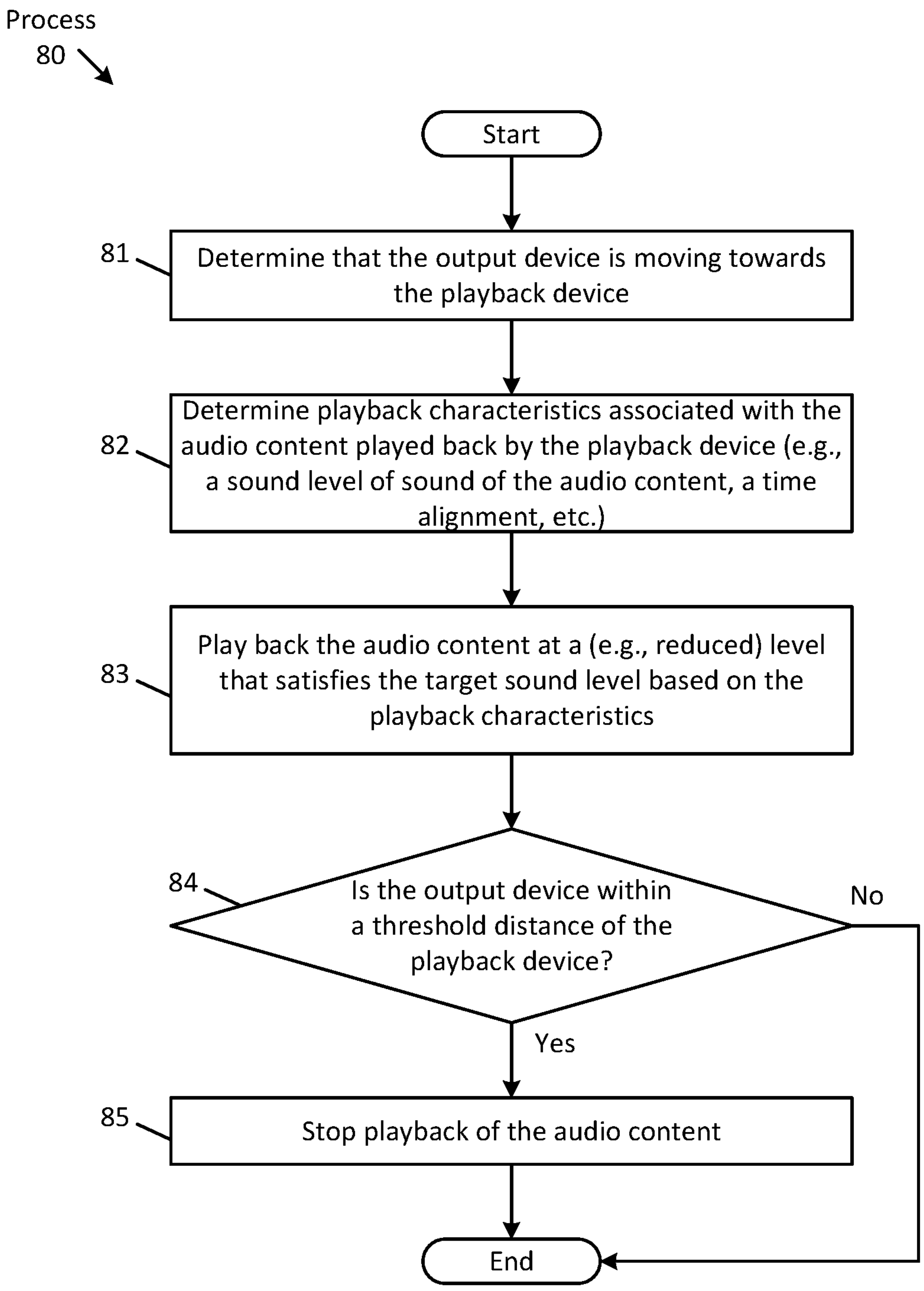
FIG. 5 is a flowchart of one aspect of a process for the output device to bridge audio playback with the playback device while the output device moves towards the playback device.
Figure 6:
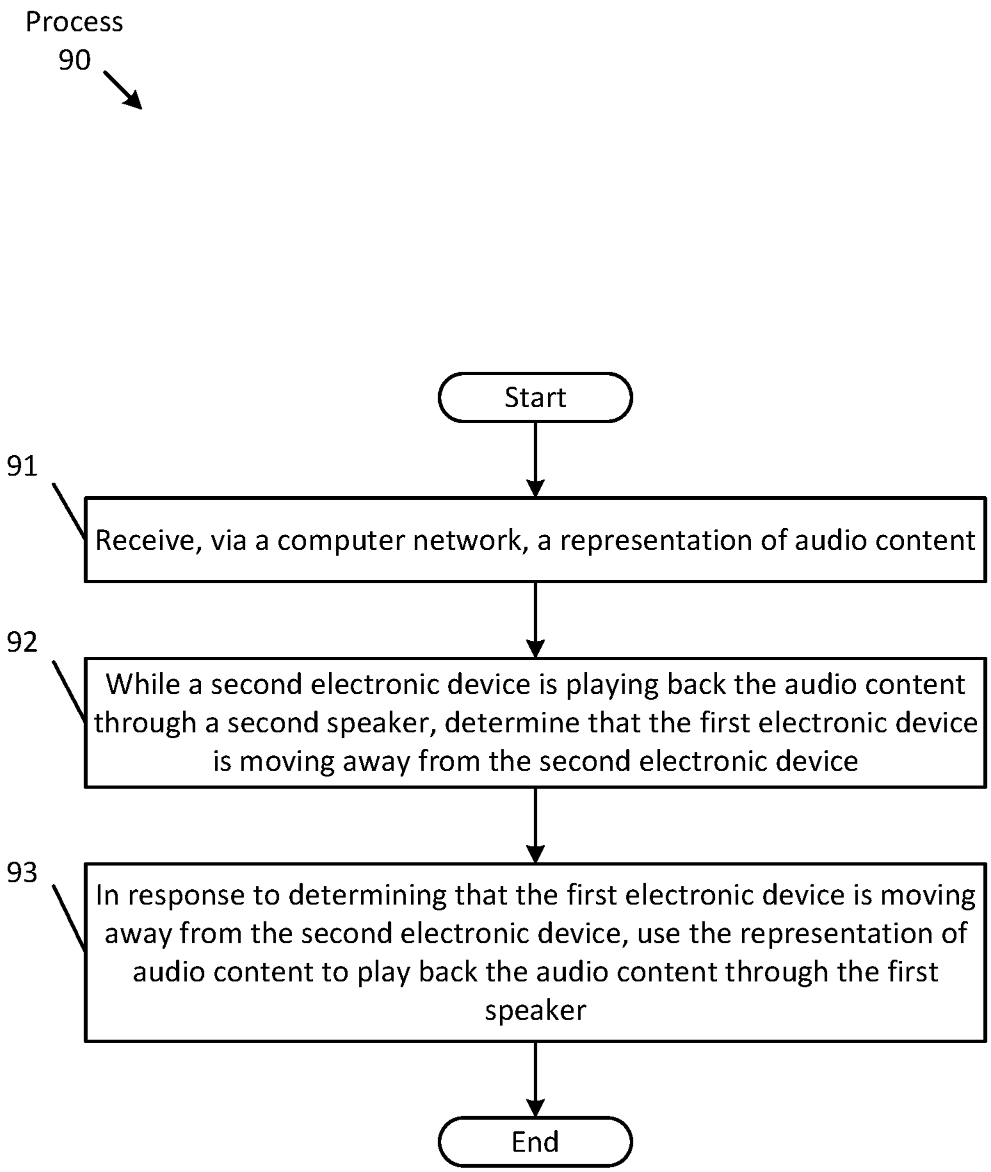
FIG. 6 is a flowchart of one aspect of a process for the output device to bridge audio playback with the playback device.

FIGS. 4-6 are flowcharts of processes 70, 80, and 90, respectively, for performing one or more operations for the output device 6 to bridge audio playback with the playback device 5 so that sound of the playback and output devices are synchronized as perceived by a listener and so that a sound level as heard by the listener is maintained as the user moves about the playback device 5. In one aspect, at least some of the operations may be performed by one or more devices of system 4, as illustrated in FIG. 2. For instance, at least some of the operations of one or more of these processes may be performed by (e.g., the controller 24 of the) output device 6. In another aspect, at least some of the operations may be performed by the playback device 5 and/or by another electronic device that is communicatively coupled with either device (e.g., a remote electronic server that is coupled via the network 23).

FIG. 4 is a flowchart of one aspect of a process 70 for the output device 6 to bridge audio playback with the playback device 5 while the output device 6 moves away from the playback device 5. The process 70 begins by the (controller 24 of the) output device 6 determining that a playback device 5 (e.g., that is within an acoustic audible range of the output device 6) is playing back (or is to play back) audio content (at block 71). In one aspect, this determination may be based on data obtained from an electronic device (e.g., remote electronic server) that is communicatively coupled with both devices. For example, the remote server may obtain location data from one or more playback devices and/or the output device 6, and determine whether the output device 6 and the playback device 5 is within a threshold distance (e.g., within the acoustic audible range). If so, the electronic device may transmit an acknowledgement message to the output device 6, indicating that a playback device 5 is within audible range. In another aspect, the remote server may transmit a (e.g., similar) message to the playback device 5. Once acknowledgement messages are received, both devices may establish a communication link (e.g., wireless connection) in order to communicate with one another.

In one aspect, the remote server may determine that the output device 6 is within an acoustic audible range of a playback device 5 that is associated with the output device 6. For example, the remote server may determine that devices are within a particular threshold (e.g., that corresponds to an acoustic audible range), and determine whether both devices are associated with a same user or user account (e.g., of a cloud-based service). If so, the remote server may communicate with the output device 6 in order to establish a connection with the playback device 5. In another aspect, the remote server may transmit the acknowledgement message to the output device 6 upon determining that the playback device 5 is playing back the audio content.

In one aspect, the output device 6 may determine that the playback device 5 is playing back audio content within the acoustic audible range based on sensor data. For example, the output device 6 may monitor ambient sounds (captured by microphone 9) to determine whether sounds of audio content are contained within one or more microphone signals. If so, the output device 6 may determine whether there is a playback device 5 (e.g., within an acoustic audible range of the output device 6). For example, the output device 6 may transmit a request to a remote server for location data of playback devices within range. Upon receiving a confirmation, the output device 6 may establish a communication link with the playback device 5. In another aspect, the output device 6 may attempt to establish a connection with one or more devices within the area, and upon establishing a connection determine whether a device is a playback device 5 that is playing back the audio content.

In one aspect, this determination may be made based on user input. For example, the output device 6 may make this determination once the device is activated (or turned on) by the user of the device. In another aspect, the device may receive user instructions to perform this determination (e.g., based on user input).

The controller 24 receives a representation of the audio content (at block 72). Specifically, the output device 6 may receive the representation from the playback device 5. For instance, upon determining that the playback device 5 (e.g., that is associated with the output device 6) is playing back audio content, the output device 6 establishes a connection with the playback device 5, and receives the representation. In one aspect, the representation may be (or include) playback data (e.g., data 30) that indicates a playback state of the audio content at the playback device 5, as described herein. In another aspect, the controller 24 may determine the representation based on sensor data from one or more sensors 26. For example, the controller may be configured to capture sound from the environment as one or more microphone signals produced by the microphone 9, and may be configured to determine the representation using the microphone signal. For instance, the controller may perform a spectral analysis upon the microphone signal to determine the representation, such as identifying the sound as including a musical composition produced by a playback device. In another aspect, the output device 6 may receiving playback data from the playback device. In some aspects, the playback data may be received from a different device (e.g., a remote server with which the output device is communicatively coupled, via the network 23).

The controller 24 retrieves the audio content based on the representation of the audio content (at block 73). For example, the content fetcher 34 may retrieve at least a portion of the audio content based on playback data of the audio content received from the playback device 5 (and/or from a remote server) via the network 23. The controller 24 determines a target sound level for the audio content that is being played back by the playback device 5 based on the representation of audio content (at block 74). For instance, the sound level estimator 33 may determine the target sound level based on playback data 30 and/or based on a microphone signal captured by the microphone 9.

The controller determines that the output device 6 is moving away from the playback device 5 (at block 75). In one aspect, the output device 6 may determine that the output device 6 is moving away based on sensor data. For instance, the output device 6 may receive motion data from the IMU 29, indicating that the output device 6 is moving. In another aspect, the determination may be based on location data. For instance, the output device 6 may determine that location data (e.g., from a GPS sensor of the output device 6) is changing with respect to location data received from the playback device 5. In another aspect, the output device 6 may determine that it is moving away based on image data obtained from the camera 28. In some aspects, the output device 6 may determine it is moving away based on microphone signals captured by the microphone 9. For instance, the output device 6 may determine that a sound level of the sound of the audio content being played back by the playback device 5 is changing (e.g., decreasing at a particular rate), which may be indicative of the devices moving apart. In another aspect, the output device 6 may determine that that it is moving away based on the wireless connection that is established between the devices. For instance, the output device 6 may determine that it is moving way by identifying a position of the device with respect to the playback device 5 based on a RSSI of the wireless connection, and determine that the output device 6 is moving away based on changes to the RSSI. In another aspect, the output device 6 may determine that it is moving away from the playback device 5 using any method.

The controller determines playback characteristics associated with the audio content played back by the playback device 5 (at block 76). Specifically, the sound level estimator 33 determines a sound level of the sound being produced by the playback device 5 at microphone 9 (e.g., using one or more (e.g., echo canceled) microphone signals captured by microphone 9). In addition to (or in lieu of) determining the sound level, the playback synchronizer 32 determines a time alignment for synchronizing playback by the output device 6 with playback of the playback device 5. In particular, the playback synchronizer may determine the time alignment for the controller 24 based on the (e.g., one or more timestamps of the) playback data and a comparison of the microphone signal and the audio content, as described herein. In some aspects, the controller may determine the one or more playback characteristics in response to determining that the output device 6 has moved (e.g., based on motion data from the IMU). In particular, the controller 24 may determine spatial characteristics associated with the audio content played back by the playback device 5, such as determining the location of the device with respect to the output device 6, as the output device moves within space.

The controller plays back the audio content at a (e.g., increased) level that satisfies the target sound level based on the determined playback characteristics, such as the sound level and according to the time alignment (at block 77). Specifically, the output device 6 may determine that the sound level at the microphone is less than the target sound level, due to the output device 6 moving away from the playback device 5. Thus, in response, the output device 6 may adjust a sound output level (e.g., level) of the output device 6 in order to compensate for the difference between the sound level and the target sound level. For example, to adjust the level, the output device 6 may apply a volume adjustment based on the difference between both levels. In particular, the sound output level may be adjusted by increasing the volume of the output device 6. In one aspect, this is performed by applying a scalar gain upon one or more audio signals of the audio content, and using the audio signal(s) to drive the speaker 8, while taking into account the time alignment.

In another aspect, the controller may also be configured to spatially render the audio content at the location of the playback device based on the playback (e.g., spatial) characteristics, as described herein). In particular, the controller 24 may apply one or more spatial filters based on the user's location (e.g., based on IMU sensor data) with respect to a determined location of the playback device.

In one aspect, the output device 6 may perform at least some of these operations as the output device 6 moves away from the playback device 5 in order to provide a consistent listening experience. As described herein, the output device 6 may playback the audio content through the speaker 8 at a level that satisfies the target sound level. As the output device 6 moves away, the sound level at the microphone signal may decrease. Thus, upon a determination that the sound level of the sound at the microphone has changed, the output device 6 may adjust the output sound level that satisfies the target sound level to compensate for the change to the sound level at the microphone. In other words, at least some of these operations may be continuously performed (e.g., over a period of time), in order to satisfy the target sound level as the output device 6 moves away.

The controller determines whether the output device 6 has moved beyond a threshold distance (at decision block 78). In one aspect, this determination may be based on sensor data. For example, the controller may determine whether the output device 6 is outside an acoustic audible range (e.g., based on whether the microphone signal has a sound level below a sound level threshold). If so, this may mean that the user of the output device 6 is unable to hear any sound being produced by the playback device 5. As a result, the output device 6 may playback the audio content at the target sound level (at block 79). Specifically, the output sound level of the output device 6 may be equal to the target sound level determined for the playback device 5. In one aspect, the output device 6 may maintain this sound level while the output device 6 is beyond the threshold distance (e.g., outside the acoustic audible range).

FIG. 5 is a flowchart of one aspect of a process 80 for the output device 6 to bridge audio playback with the playback device 5 while the output device 6 moves towards the playback device 5. In one aspect, at least some of the operations described in this process may be performed after (or before) one or more operations described in process 70 of FIG. 4. For instance, the operations in this process may be performed a period of time after process 70 is performed. For example, process 70 may be performed by the output device 6 as the user 10 of the device moves away from the playback device 5, as shown and described with respect to FIG. 1. The operations of this process may be performed while the output device 6 is playing back audio content and the user 10, who is wearing or holding the output device 6, is moving (back) towards the playback device 5 (e.g., within the room 7).

The process 80 begins by the controller 24 determining that the output device 6 is moving towards the playback device 5 (at block 81). Specifically, the controller may perform similar operations as those described herein to determine that the device is moving towards the playback device 5. In one aspect, the controller may perform similar operations as those described in block 75 of process 70. For example, the controller may receive location data (e.g., from the playback device 5 and/or from a remote server with which the devices are communicatively coupled) and compare the location data to location data of the output device 6. The controller determines playback characteristics associated with the audio content played back by the playback device 5 (at block 82). In particular, the controller may perform similar operations as those describe in block 76 of process 70 in order to determine a sound level of sound of the audio content being produced by the playback device 5 and/or a time alignment based on playback data from the playback device 5.

The controller plays back the audio content at a (e.g., reduced) level that satisfies the target sound level based on the playback characteristics, such as the determined sound level and according to the time alignment (at block 83). Specifically, the controller determines that the sound level at the microphone has increased, and as a result the combination of the sound level of the sound produced by the playback device 5 and the sound output level of the speaker 8 may exceed the target sound level. Thus, the controller may adjust the sound output level of the output device 6 in order to compensate for the increase in the overall sound level. In particular, the controller may reduce the sound level of the speaker 8 based on the increase in the sound level of the microphone (e.g., based on a comparison of a pervious determined sound level with respect to a current sound level). In another aspect, the controller may reduce the sound level based on a difference between the target sound level and a combination of the sound level at the microphone and the output sound level of the speaker. Thus, in response to determining that the output device 6 is moving towards the playback device 5, the sound output level of the speaker 8 is reduced.

In one aspect, the audio renderer 35 may perform one or more audio signal processing operations in order to reduce the output sound level of the speaker. For example, to reduce the sound output level, the audio renderer 35 may attenuate a signal level of (e.g., by applying a scalar gain based on the sound level at the microphone to) the audio signal of the audio content based on changes to the sound level of the sound produced by the playback device 5 at the microphone of the output device 6. In one aspect, the output device 6 may perform these operations while the device is moving towards the playback device 5. As a result, the output device 6 may continue to attenuate the audio signal (e.g., proportionally), as the device moves closer to the playback device 5. Thus, the controller processes the audio signal by fading out (or partially fading out) sound produced by the speaker 8.

The controller 24 determines if the output device 6 is within a threshold distance of the playback device 5 (at decision block 84). Specifically, the controller is determining whether the output device 6 is close to the playback device 5 such that sound produced by the playback device 5 satisfies the target sound level and therefore the output device 6 is no longer needed to produce sound of the audio content. In one aspect, the controller may make this determination based on the sound level at the microphone. Specifically, the controller may determine whether the sound level of the sound played back by the playback device 5 is equal to or exceeds the target sound level. If so, the controller may determine that the output device 6 is within the threshold distance. In another aspect, the determination may be based on other data, as described herein. If the output device 6 is within the threshold distance, the controller may stop playback of the audio content through the speaker 8 by ceasing to use the audio signal from the content fetcher 34 to drive the speaker 8 (at block 85).

FIG. 6 is a flowchart of one aspect of a process 90 for the output device 6 to bridge audio playback with the playback device 5. The process 90 begins by the controller receiving, via a computer network (e.g., network 23) a representation of audio content (at block 91). For example, the representation may include playback data received by one or more playback devices that are playing back the audio content. While a second electronic device (e.g., playback device 5) is playing back the audio content through a second speaker (e.g., speaker 21), the controller determines that a first electronic device (e.g., the output device 6) is moving away from the second electronic device (at block 92). In response to determining that the first electronic device is moving away from the second electronic device, the controller users the representation of audio content to play back the audio content through the first speaker (at block 93). For example, the controller may use playback data to synchronize playback of the audio content by the first electronic device with a playback state of the audio content at the second electronic device. In particular, the controller may playback the audio content according to a (e.g., current playback) timestamp of the playback state such that sound produced by the second speaker and sound produced by the first speaker is synchronized as perceived by the user 10 of the output device 6. As described herein, the controller may play back the audio content according to the timestamp while taking into account acoustic ToF. As a result, both devices may playback the audio content asynchronously (e.g., the output device 6 playing back the audio content after the playback device 5), while sound produced by both devices arrive at the user (e.g., the user's ear(s)) at (approximately) the same time, thereby giving the user the perception that the sound is synchronized. In one aspect, the sound output by the output device 6 may provide the user the perception that the combined sound originates from the playback device's location. For instance, the controller may spatially render the audio signal (e.g., using one or more HRTFs) at a virtual sound source that is located (approximately) at the playback device's location.

Some aspects may perform variations to the processes 70, 80, and/or 90 described in FIGS. 4-6. For example, the specific operations of at least some of the processes may not be performed in the exact order shown and described. The specific operations may not be performed in one continuous series of operations and different specific operations may be performed in different aspects. For example, as described thus far, the controller may playback the audio content at a level that satisfies the target level based on the determined sound level and according to the time alignment. In one aspect, the controller may perform these operations without user intervention (e.g., automatically). In another aspect, the controller may request user authorization (approval) before applying audio signal processing operations in order to satisfy the target level. For instance, the controller may output a notification (e.g., an audible notification via the speaker 8 and/or a visual (e.g., pop-up) notification via the display screen 27), indicating that the target sound level is not satisfied. Specifically, the controller may indicate that the sound output level of the speaker 8 is not sufficient to compensate for a detected change to the sound level at the microphone. Upon receiving user input (e.g., a user selection of a user interface (UI) item on the display screen, a voice command, etc.), the controller may proceed to playback the audio content, as described herein.

As described thus far, the output device 6 is configured to bridge audio playback with one or more playback devices 5. Specifically, the output device 6 may perform at least some of the operations described herein in order to compensate audio playback by the playback device 5. In another aspect, the output device 6 may be configured to bridge audio playback that has commenced at the output device 6 with the playback devices. For example, the output device 6 may be playing back audio content (e.g., based on user input of the user 10). In which case, the user may be perceiving the audio content at a particular sound level. In one aspect, the output device 6 may bridge playback with playback devices that are nearby (e.g., within acoustic audible range). For instance, the output device 6 may communicate (e.g., via network 23) with a remote electronic server to identify whether one or more playback devices are within an acoustic audible range. If so, the output device 6 may transmit playback data to the playback device 5, and instruct the playback device 5 to playback the audio content. In one aspect, the output device 6 may transmit instructions to the playback device 5 to playback the audio content at a particular sound level (e.g., target level). As a result, the output device 6 may perform open or more operations described herein in order to satisfy the sound level of the playback device 5.

As described thus far, the controller 24 of the output device 6 may perform one or more operations to satisfy the target sound level of the playback device 5. In another aspect, the output device 6 may transmit playback data to the playback device 5 that includes one or more instructions for the playback device 5 to perform one or more of the operations described herein. For example, as the output device 6 moves closer to the playback device 5, the output device 6 may determine a volume adjustment for the playback device 5 based on determined playback characteristics, and may transmit the volume adjustment to the playback device 5. In turn, the playback device 5 may adjust sound output according to the volume adjustment. For example, as the output device 6 moves away from the playback device 5, the output device 6 may instruct the playback device 5 to turn up the volume in order to compensate for the increasing distance between the devices.

In some aspects, since the output device's position may be stationary with respect to the user, the output device 6 may perform one or more audio signal processing operations as well. For example, as the output device 6 moves away from the playback device 5, the output device 6 may apply a volume adjustment as well in order for both devices to increase an overall volume.

Figure 7:
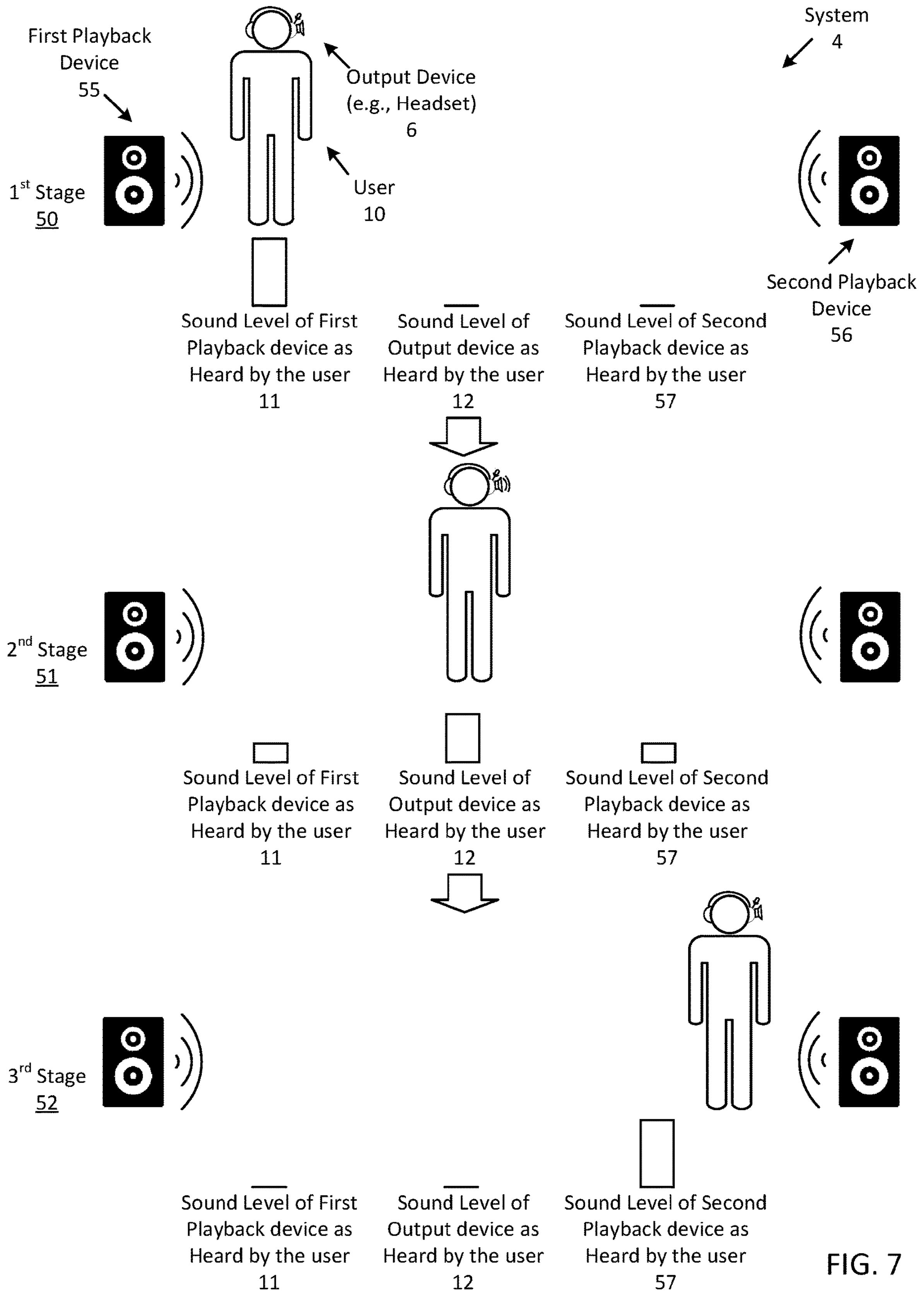
FIG. 7 illustrates several stages in which the output device maintains the sound level as heard by a user while the user moves between two separate playback devices that are playing back audio content according to one aspect.

As described herein, the output device 6 is configured to bridge audio playback with a playback device 5, as shown in FIG. 1. In another aspect, the output device 6 may be configured to bridge audio playback with two or more playback devices, whereby the output device 6 may be configured to adjust sound output based on audio playback of the playback devices in order to provide the user with a consistent listening experience. FIG. 7 shows such an example.

FIG. 7 illustrates three stages 50-52 in which the output device 6 maintains the sound level as heard by the user 10 while the user moves between two separate playback devices, a first playback device 55 and a second playback device 56, both of which are playing back audio content according to one aspect. Specifically, each stage shows the first playback device 55 and the second playback device 56 that are both playing back the same audio content (e.g., a musical composition), and the user 10 who is wearing the output device 6. In addition, each stage shows a sound level 11 of the first playback device 55, a sound level 57 of the second playback device 56, as well as the sound level 12 of the output device 6, where each level is as heard by the (e.g., microphone 9 of the output device 6 that is being worn by the) user 10. In one aspect, each of the sound levels may be a (e.g., perceived) loudness level (e.g., in dB SPL) at or near the user's ear (or ear canal).

In the first stage 50, the user 10 who is wearing the output device 6 is positioned next to the first playback device 55. In which case, the user is hearing most (if not all) of the audio content from the first playback device 55, while not hearing (or hearing very little) content from the output device 6 and the second playback device 56. This is shown by the sound levels 12 and 57 being approximately zero (or below a threshold). In one aspect, the sound level 11 at this stage may be defined (e.g., by the system 4) as being the target sound level. For example, in this stage the output device 6 may perform at least some of the operations described herein (e.g., in process 70 of FIG. 4) to determine the target sound level. In one aspect, the output device 6 may perform these operations based on user input (e.g., the user activating the output device 6, the user selecting a UI item in a graphical user interface (GUI) displayed on display screen 27, etc.). For example, upon being activated, the output device 6 may determine a sound level at the microphone 9 (at this location) as being the target sound level at which the user 10 wishes to hear the audio content. In one aspect, since the sound level 11 at this stage is the target sound level, the output device 6 may not be playing back the audio content, since the sound level at the microphone is equal to (or greater) than the target level 11. In another aspect, at this stage 50, the threshold distance from which the output device 6 ceases to playback the audio content may be defined (e.g., as being the distance between the user 10 and the first playback device 55).

The second stage 51 shows that the user 10 has moved away from the first playback device 55 and towards the second playback device 56. In particular, as the user has moved away from the first playback device 55, the sound level 11 perceived by the user 10 has decreased, while the sound level 57 of the second playback device 56 has increased. For instance, this may be due to the user 10 having moved within a room where both playback devices are at opposite sides of the room. As a result of moving away from the first playback device 55, the output device 6 has begun to produce sound to satisfy the target sound level, as shown in the first stage 50. In addition, the output device 6 may be configured to take into account the sound level 57. Specifically, upon detecting sound of both devices, the output device 6 may determine their respective sound levels, and then adjust the sound output level of (e.g., applying a scalar gain to an audio signal of the audio content that is used to drive) the speaker 8 in order to maintain the target sound level as perceived by the user. Thus, as shown, the combination of sound levels 11, 12, and 57 is equal to (or approximate to) the sound level 11 in the first stage 50.

In one aspect, the output device 6 may synchronize playback based on playback data received from and/or transmitted to either or both of the playback devices 55 and 56. For example, the output device 6 may receive playback data from both devices and determine one or more time alignments to be applied in order for sound produced by the output device 6 to be perceived by the user as being synchronous with sound of either or both of the playback devices. In one aspect, the output device 6 may apply different time alignments to one or more audio signals of the audio content. In another aspect, the output device 6 may transmit playback data to synchronize playback. For instance, the output device 6 may transmit playback data to the second playback device 56 to apply one or more time alignments to delay playback in order for sound produced by the second playback device to arrive (approximately) at the same time (at microphone 9) as sound from the first playback device 55. Along with (or in lieu of) instructing the sound playback device 56 to delay playback, the output device 6 may instruct the second playback device 56 to adjust sound output in order to ensure that the target sound level is maintained as the user moves closer to the second playback device 56.

The third stage 52 shows that the user 10 has moved closer to the second playback device 56, such that the user is now unable to hear sound from the first playback device (and/or the sound level of sound produced by the first playback device is below a threshold level at the user's position), as shown by the sound level 11 being low. With the sound level 57 having increased due to the user being closer to the second playback device 56, the output device 6 has reduced the sound output level of the speaker 8. Specifically, with the user moving towards the second playback device 56, the output device 6 has attenuated sound output of the speaker, and has reduced the sound level 12 of the output device 6. As shown, in fact, the output device 6 has ceased playing back the audio content (as shown by the sound level 12). In one aspect, the output device 6 may have ceased playback based the output device being within a threshold distance of the second playback device 56. In another aspect, the output device 6 may have ceased sound output based on the sound level at the microphone being at least (or having reached) the target sound level.

In one aspect. the electronic device (e.g., the output device 6, which may be a headset and/or a wearable device such as a pair of smart glasses, which has an extra-aural speaker) plays back audio content after the second electronic device (e.g., playback device 5, such as a smart speaker or a television) plays back the audio content (e.g., in order to synchronize the sound of the audio content as perceived by the user 10). In another aspect, playback by both the first and second electronic devices is perceived by a user who is holding or wearing the first electronic device as being synchronized, while both the first and second electronic devices playback the audio content asynchronously (e.g., the output device 6 playing back the same audio content as the playback device 5, but at a later time).

In some aspects, playback of the audio content through the first speaker (e.g., speaker 8) at a level that satisfies the target sound level includes, in accordance with a determination, while the first electronic device is moving away from the second electronic device, that the sound level of the sound of the audio content at a microphone has changed, adjusting the level that satisfies the target sound level to compensate for the change to the sound level. In some aspects, adjusting the level that satisfies the target sound level includes applying a volume adjustment to the first electronic device based on a difference between the sound level and the change to the sound level. In another aspect, the level that satisfies the target sound level is increased as the first electronic device moves away from the second electronic device.

In one aspect, in accordance with a determination that the first electronic device has moved within a threshold distance from the second electronic device, the first electronic device stops playback of the audio content (e.g., by ceasing to use the audio signal to drive the first speaker).

In one aspect, the first electronic device is communicatively coupled via a wireless connection with the second electronic device, and where determining that the first electronic device is moving away from the second electronic device includes identifying a position of the first electronic device with respect to the second electronic device (e.g., based on a RSSI of the wireless connection), and determining that the first electronic device is moving away from the position based on changes to the RSSI. In another aspect, using the representation of audio content to playback the audio content includes using the identification of the audio content to retrieve an audio signal from either a remote electronic server or local memory of the first electronic device, wherein the audio signal includes the audio content; and using the audio signal to drive the first speaker to produce sound of the audio content.

In another aspect, the playback state includes a timestamp of a portion of the audio content that is to be played back by the second electronic device, using the playback data to synchronize playback includes playing back the portion of the audio content according to the timestamp such that sound produced by the second speaker of the second electronic device while playing back the portion of the audio content and sound produced by the first speaker of the first electronic device while playing back the portion of the audio content is synchronized as perceived by a user of the first electronic device.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As previously explained, an aspect of the disclosure may be a non-transitory machine-readable medium (such as microelectronic memory) having stored thereon instructions, which program one or more data processing components (generically referred to here as a "processor") to perform the network operations and audio signal processing operations, as described herein. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method comprising:

while an electronic device that includes a first speaker is playing back audio content and a headset is worn by a user, determining that the headset is moving away from the electronic device;

receiving, via a network, a representation of the audio content at the headset that includes a second speaker, wherein the representation of the audio content comprises playback data that indicates a playback state of the audio content at the electronic device; and in response to determining that the headset is moving away from the electronic device, using the playback data to synchronize playback of the audio content through the second speaker of the headset with the playback state.

2. The method of claim 1 further comprising determining an acoustic time of flight (ToF) of sound produced by the first speaker, wherein the playback state includes a timestamp of a portion of the audio content that is to be played back by the electronic device, wherein using the playback data to synchronize playback of the audio content comprises playing back the portion of the audio content through the second speaker according to the timestamp while taking into account the acoustic ToF, such that 1) sound of the portion of the audio content produced by the first speaker of the electronic device and 2) sound of the portion of the audio content produced by the second speaker of the headset is synchronized as perceived by the user.

3. The method of claim 1 further comprising:

determining a target sound level for the audio content based on the representation of audio content; and determining a sound level of sound of the audio content played back by the electronic device at a microphone of the headset, wherein using the playback data to synchronize playback comprises playing back the audio content through the second speaker at a level that satisfies the target sound level based on the sound level.

4. The method of claim 1, wherein using the playback data to synchronize playback comprises using an audio signal that has the audio content to drive the second speaker, wherein the method further comprises attenuating a signal level of the audio signal at the headset based on changes to a sound level of the audio content played back by the electronic device at a microphone of the headset as the headset moves towards the electronic device.

5. The method of claim 1, wherein the electronic device is a first electronic device, wherein the method further comprises in accordance with a determination that the headset is moving towards a second electronic device that is playing back the audio content through a third speaker, reducing a sound output level of the second speaker.

6. The method of claim 1 further comprising:

determining a location of the electronic device with respect to the headset; and spatially rendering the audio content to produce a virtual sound source at the location that includes the audio content through the second speaker.

7. The method of claim 1 further comprising determining a sound level of sound of the audio content played back by the electronic device at a microphone of the headset, wherein determining that the headset is moving away from the electronic device comprises detecting that the sound level of the sound is decreasing at a particular rate.

8. A headset comprising:

a first speaker;

one or more processors; and memory having instructions stored therein which when executed by the one or more processors causes the headset to:

while an electronic device that includes a second speaker is playing back audio content and the headset is worn by a user, determine that the headset is moving away from the electronic device;

receive, via a network, a representation of the audio content that comprises playback data that indicates a playback state of the audio content at the electronic device; and in response to determining that the headset is moving away from the electronic device, use the playback data to synchronize playback of the audio content through the first speaker with the playback state.

9. The headset of claim 8, wherein the memory has further instructions to determine an acoustic time of flight (ToF) of sound produced by the second speaker, wherein the playback state includes a timestamp of a portion of the audio content that is to be played back by the electronic device, wherein the instructions to use the playback data to synchronize playback of the audio content comprises instructions to play back the portion of the audio content through the first speaker according to the timestamp while taking into account the acoustic ToF, such that 1) sound of the portion of audio content produced by the second speaker of the electronic device and 2) sound of the portion of the audio content produced by the first speaker of the headset is synchronized as perceived by the user.

10. The headset of claim 8, wherein the memory has further instructions to:

determine a target sound level for the audio content based on the representation of audio content; and determine a sound level of sound of the audio content played back by the electronic device at a microphone of the headset, wherein instructions to use the playback data to synchronize playback of the audio content through the first speaker comprises instructions to play back the audio content through the first speaker at a level that satisfies the target sound level based on the sound level.

11. The headset of claim 8, wherein instructions to use the playback data to synchronize playback of the audio content comprises instructions to use an audio signal that has the audio content to drive the first speaker, wherein the memory has further instructions to attenuate a signal level of the audio signal at the headset based on changes to a sound level of the audio content played back by the electronic device at a microphone of the headset as the headset moves towards the electronic device.

12. The headset of claim 8, wherein the electronic device is a first electronic device, wherein the memory has further instructions to in accordance with a determination that the headset is moving towards a second electronic device that is playing back the audio content through a third speaker, reduce a sound output level of the first speaker.

13. The headset of claim 8, wherein the memory has further instructions to:

determine a location of the electronic device with respect to the headset; and spatially render the audio content to produce a virtual sound source at the location that includes the audio content through the first speaker.

14. The headset of claim 8, wherein the memory has further instructions to determine a sound level of sound of the audio content played back by the electronic device at a microphone of the headset, wherein instructions to determine that the headset is moving away from the electronic device comprises instructions to detect that the sound level of the sound is decreasing at a particular rate.

15. A non-transitory computer-readable memory having stored therein instructions which when executed by a processor of a headset causes the headset to:

while an electronic device that includes a first speaker is playing back audio content and the headset is worn by a user, determine that the headset is moving away from the electronic device;

receive, via a network, a representation of the audio content at the headset that includes a second speaker, wherein the representation of the audio content comprises playback data that indicates a playback state of the audio content at the electronic device; and in response to determining that the headset is moving away from the electronic device, use the playback data to synchronize playback of the audio content through the second speaker of the headset with the playback state.

16. The non-transitory computer-readable memory of claim 15 further comprises instructions to determine an acoustic time of flight (ToF) of sound produced by the first speaker, wherein the playback state includes a timestamp of a portion of the audio content that is to be played back by the electronic device, wherein the instructions to use the playback data to synchronize playback of the audio content comprises instructions to play back the portion of the audio content through the second speaker according to the timestamp while taking into account the acoustic ToF, such that 1) sound of the portion of the audio content produced by the first speaker of the electronic device and 2) sound of the portion of the audio content produced by the second speaker of the headset is synchronized as perceived by the user.

17. The non-transitory computer-readable memory of claim 15, wherein the memory has further instructions to:

determine a target sound level for the audio content based on the representation of audio content; and determine a sound level of sound of the audio content played back by the electronic device at a microphone of the headset, wherein instructions to use playback data to synchronize playback comprises instructions to play back the audio content through the second speaker at a level that satisfies the target sound level based on the sound level.

18. The non-transitory computer-readable memory of claim 15, wherein instructions to use the playback data to synchronize playback of the audio content comprises instructions to use an audio signal that has the audio content to drive the second speaker, wherein the memory has further instructions to attenuate a signal level of the audio signal at the headset based on changes to a sound level of the audio content played back by the electronic device at a microphone of the headset as the headset moves towards the electronic device.

19. The non-transitory computer-readable memory of claim 15, wherein the electronic device is a first electronic device, wherein the memory has further instructions to in accordance with a determination that the headset is moving towards a second electronic device that is playing back the audio content through a third speaker, reduce a sound output level of the second speaker.

20. The non-transitory computer-readable memory of claim 15 further comprises instructions to:

determine a location of the electronic device with respect to the headset; and spatially render the audio content to produce a virtual sound source at the location that includes the audio content through the second speaker.

21. The non-transitory computer-readable memory of claim 15, wherein the memory has further instructions to determine a sound level of sound of the audio content played back by the electronic device at a microphone of the headset, wherein instructions to determine that the headset is moving away from the electronic device comprises instructions to detect that the sound level of the sound is decreasing at a particular rate.

* * * * *